PHOTOCELL POSITION DETECTOR FOR ELEVATOR CARS INCLUDING A PERFORATED TAPE UNIQUELY ENCODED FOR EACH POSITION WITH RESPONSIVE CONTROL MEANS

Original Filed Nov. 22, 1961 9 Sheets-Sheet 1

WILLIAM HENRY BRUNS
LEW H. DIAMOND
HERBEET JACOBY
INVENTOR

BY A. J. De Angelis ATTORNE

PHOTOCELL POSITION DETECTOR FOR ELEVATOR CARS INCLUDING A PERFORATED TAPE UNIQUELY ENCODED FOR EACH POSITION WITH RESPONSIVE CONTROL MEANS

Original Filed Nov. 22, 1961 9 Sheets-Sheet 3

WILLIAM HENRY BRUNS
LEW H. DIAMOND
HERBERT JACOBY
INVENTORS
BY A. J. De Angelis ATTORNEY PHOTOCELL POSITION DETECTOR FOR ELEVATOR CARS INCLUDING A PERFORATED TAPE UNIQUELY ENCODED FOR EACH POSITION WITH RESPONSIVE CONTROL MEANS Original Filed Nov. 22, 1961 9 Sheets-Sheet 3

WILLIAM HENRY BRUHS
LEW. H. DIAMOND
HERBERT JACOBY
INVENTOR
BY A. J. De Angelis ATTORNEY PHOTOCELL POSITION DETECTOR FOR ELEVATOR CARS INCLUDING A PERFORATED TAPE UNIQUELY ENCODED FOR EACH POSITION WITH RESPONSIVE CONTROL MEANS Original Filed Nov. 22, 1961 9 Sheets-Sheet 4

WILLIAM HENRY BRUNS
LEWIS H. DIAMOND
HERBERT JACOBY
INVENTORS

BY A. J. De Angelis ATTORNEY

PHOTOCELL POSITION DETECTOR FOR ELEVATOR CARS INCLUDING A PERFORATED TAPE UNIQUELY ENCODED FOR EACH POSITION WITH RESPONSIVE CONTROL MEANS

Original Filed Nov. 22, 1961 9 Sheets-Sheet 5

WILLIAM HENRY BRUNS
LEW H. DIAMOND
HERBERT JACOBY
INVENTOR
BY A. J. De Angelis ATTORNEY PHOTOCELL POSITION DETECTOR FOR ELEVATOR CARS INCLUDING A PERFORATED TAPE UNIQUELY ENCODED FOR EACH POSITION WITH RESPONSIVE CONTROL MEANS Original Filed Nov. 22, 1961 9 Sheets-Sheet 6

WILLIAM HENRY BRUNS
LEW H. DIAMOND
HERBERT JACOBY
INVENTORS

BY A. J. De Angelis ATTORNEY

PHOTOCELL POSITION DETECTOR FOR ELEVATOR CARS INCLUDING A PERFORATED TAPE UNIQUELY ENCODED FOR EACH POSITION WITH RESPONSIVE CONTROL MEANS

Original Filed Nov. 22, 1961 9 Sheets-Sheet 7

WILLIAM HENRY BRUHS
LEW H. DIAMOND
HERBERT JACOBY
INVENTOR
BY A. J. De Angelis ATTORNEY WILLIAM HENRY BRUNS
LEW H. DIAMOND
HERBERT JACOBY
INVENTOR
BY A. J. De Angelis ATTORNEY PHOTOCELL POSITION DETECTOR FOR ELEVATOR CARS INCLUDING A PERFORATED TAPE UNIQUELY ENCODED FOR EACH POSITION WITH RESPONSIVE CONTROL MEANS Original Filed Nov. 22, 1961 9 Sheets-Sheet 9

WILLIAM HENRY BRUNS
LEW H DIAMOND
HERBERT JACOBY } INVENTOR
BY A. J. DeAngelis ATTORNEY United States Patent Office Re. 27,185
Reissued Oct. 12, 1971

27,185

PHOTOCELL POSITION DETECTOR FOR ELEVATOR CARS INCLUDING A PERFORATED TAPE UNIQUELY ENCODED FOR EACH POSITION WITH RESPONSIVE CONTROL MEANS

William Henry Bruns, deceased, late of Lincolndale, Somers, N.Y., by Eva C. Bruns, executrix, De Bary, Fla., and Lew H. Diamond, Massapequa, and Herbert Jacoby, Jamaica, N.Y., assignors to Otis Elevator Company, New York, N.Y.

Original No. 3,414,088, dated Dec. 3, 1968, Ser. No. 154,132, Nov. 22, 1961. Application for reissue June 6, 1969, Ser. No. 844,219

Int. Cl. B66b *1/16*

U.S. Cl. 187—29 R 42 Claims

Matter enclosed in heavy brackets [ ] appears in the original patent but forms no part of this reissue specification; matter printed in italics indicates the additions made by reissue.

*ABSTRACT OF THE DISCLOSURE*

*This application concerns an elevator system which eliminates most of the maintenance problems associated with prior systems. Virtually trouble free logic circuit elements composed of static-type electronic and solid state elements are substituted for primarily all the mechanical and electro-mechanical devices which were used in earlier systems.*

*In one of the disclosed embodiments a tape is driven over a sheave by the elevator car to duplicate its movement. This tape is slotted to form rows of slots at various points along its length in accordance with a binary code so that each point corresponds to a predetermined position in the hoistway and the code in each row identifies its corresponding position. As the car moves through the hoistway, the code, associated with each of the various positions it passes, is converted into electrical output signals by means of a light source and photocell translator. This provides information concerning the location of the car. This information in conjunction with that concerning the speed of the car as provided by signals derived from a tachometer generator is applied to various electronic tube and solid state circuits which perform the essential logic functions necessary to control the operation of the car.*

This invention relates to elevator control systems, and has particular relation to such systems employing selectors and controllers constructed primarily of electronic and static components.

In elevator installations up landing controls and down landing controls are provided at landings for registering landing calls, while the elevator car is provided with controls for registering car calls for service to the various landings. In certain installations the car operates without an attendant, and the elevator controls are arranged to control the movements of the car automatically in response to service demand.

In such non-attendant systems, the car is automatically started in response to a demand for service registered by the landing or car call controls. It is accelerated toward the landing to be serviced, and, in advance of its arrival at such landing, the registered call is picked up and cancelled. As the call is picked up, slowdown and stopping are initiated, causing the car to decelerate and level to a stop at such landing.

In order to properly control the car movements, such control systems must be accurately informed of the position and movement of the car in relation to landings for which service calls are registered. Prior at control arrangements have obtained this information by employing one of several different types of landing or floor selectors which, in conjunction with controllers, control the elevator movements. One such selector is of a mechanical type in which floor bars are vertically spaced apart in proportion to the spacing between landings. Stationary contacts are mounted on such floor bars in position for engagement by brushes carried by a vertically movable carriage, termed a synchronous panel, which duplicates car movement. An advancer panel may be mounted on the movable carriage and moved relative thereto, in response to car movement, to advance fictitiously the position of the car; brushes carried by the advancer panel engaging cooperating stationary contacts in advance of the position of the synchronous panel. Alternatively, advancer functions may be provided by utilizing elongated stationary contacts or brushes on the floor bars and synchronous panel, respectively. Levelling control mechanisms, consisting of movable cams, their co-operating cam followers and associated switches are also often included in such mechanical type selectors. Another type of selector is the stepping switch or notching type wherein a brush assembly is notched or advanced by a predetermined discrete distance for each movement of an elevator car between successive landings. In this type of selector, the brush movement is independent of the spacing between successive landings. Examples of these prior art selectors will be found in the E. L. Dunn et al. Pat. No. 2,074,578; the A. W. Noon Pat. No. 2,711,-799 and the M. Stanley Pat. No. 2,014,821.

It should be noted that in these prior art selectors relatively movable parts such as movable carriages, brush assemblies, motor mechanisms, sliding contacts, cams, cam followers and switches have been employed. The controllers used in conjunction with such selectors usually are constructed of a relatively large number of electromagnetic switches. Switches having a considerable number of contacts are often used in order to provide all the desired control operations. Such equipment is bulky, heavy, consumes considerable power and is costly to install and maintain.

Such control systems are usually tailored to the particular installation, and, while some of the equipment and circuits are common to the installations, a considerable amount is variable to suit the requirements of the particular installation. This involves modification of the selector and the addition or removal of electromagnetic switches and the change of switches to provide a different number of control contacts.

Attempts have been made to improve upon such prior art arrangement. For example, the W. G. Hall et al., Pat. No. 2,806,554, issued Sept. 17, 1957, discloses a control arrangement in which a selector unit is provided for each landing. Each unit is constructed of various static type, electrical elements interconnected in such fashion as to produce a voltage output at an associated terminal in response to an input signal. Inductor type switches are utilized in the hoistway to provide input signals to the various selector units in response to car movement, the voltage outputs, appearing at the terminals, indicating in discrete steps the position of the car at the landings.

It is desirable to provide an elevator control system which is reliable in operation, and economical to install, operate and maintain.

It is, therefore, an object of the invention to provide an elevator control system having an improved landing selector and controller.

It is a further object of the invention to provide an elevator system having a landing selector and controller constructed primarily of electronic and static elements.

In carrying out the invention according to the preferred embodiment, elevator control is effected through logic circuitry constructed primarily of electronic and static components, such as electron tubes and solid state devices. Inputs to the logic circuitry are in terms of voltage and consist of information relating to:

(1) The position and movement of the elevator car in relation to the landings
(2) The speed of the car
(3) The landings for which service demand is registered.

Control functions performed in response to the foregoing inputs include:

(1) Establishing a direction of car travel
(2) Starting of the car
(3) Acceleration
(4) Selecting a stop in advance of a traveling car
(5) Cancellation, in advance of stopping, of the car and hall calls for selected stops
(6) Deceleration
(7) Leveling at a landing stop
(8) Stopping.

The inputs relating to the position and movement of the elevator car are obtained by assigning a predetermined code to prescribed points along the path of travel of the car in the hoistway. Means are provided to read the code, as the position of the car coincides with such prescribed points, by selectively actuating a plurality of photoconductive switches, according to the predetermined code, to produce gating of blocking voltage combinations. The gating voltage combinations which are thus generated are fed through a decoding matrix designed to translate the code read into car positions by providing voltage outputs at terminals corresponding to the predetermined positions of the car in the hoistway; the appearance of a potential at an output terminal of the matrix, indicating the position of the car, corresponding to such terminal. The number of different combinations of unactuated and actuated photoconductive switches obtainable (i.e., the number of possible gating voltage combinations), excluding the case where all photoconductive switches are in an unactuated state, may be expressed by the formula $2^N-1$, where N represents the number of photoconductive switches provided and which may be actuated. For example, with 4 photoconductive switches, 15 different combinations of gating voltages are obtainable, each one of which combinations corresponds to a certain position of the car in the hoistway. With the addition of one photoconductive switch, increasing the number of photoconductive switches from 4 to 5, the number of gating voltage combinations obtainable, and in turn the positions of the car which may be indicated, is approximately doubled to 31, and so on.

Information relating to the position of the car is obtained, preferably for: the position of the car at each landing, whether or not it is within a stopping zone, extending a certain distance above and below each landing, and the position of the car at preselected acceleration and deceleration distances from each landing. The landings for which service demand is registered is indicated in terms of voltages obtained directly from the hall and car call registering circuits. The service demand voltage outputs, in conjunction with the car position voltages, are fed to a comparison network which relates the car position to the location of the service demand, and in response thereto effects the establishment of a direction of car travel, and initiates car starting. Once a direction of car travel is established, it is maintained until no further demand exists in that diretcion. As the car, in its movement from the starting landing, arrives at prescribed acceleration points, voltages appear at the matrix output terminals, corresponding to such points, and are utilized to actuate car acceleration control mechanism.

The speed of the car is measured in terms of voltage which is utilized to produce voltage input signals, corresponding to certain car speeds. "Advance" circuitry responds to such speed voltage input signals to produce output signals which fictitiously represent the car to be traveling in advance of its true or actual position by prescribed amounts in accordance with the car speed. The indicated "advance" car position is compared with the location of the registered service demand in a coincident network such that when the "advance" position of the car coincides with the location of the service demand, an output signal results, indicating selection of a stop, and which signal is utilized to stop operation of the advancer, initiate slowdown of the car and cancellation of the service demand for such landing stop.

As the car in its approach to the landing at which a stop is to be made moves past predetermined deceleration points, output signals at the aforementioned car position matrix terminals, corresponding to such deceleration points, indicates its movement past such points. A deceleration network compares the speed of the car with its position at such deceleration points to initiate, selectively, steps of retardation in accordance with the car speed at predetermined distances from the landing at which the stop is to be made.

Incident to slowdown, a second coincident network compares the actual car position with its "advance," position, producing, when the two coincide as the car arrives at a level with the landing at which a stop is to be made, a voltage signal which is utilized to actuate stopping mechanism to bring the car to a stop at the landing. Should the car, in stopping, move out of a certain stopping zone, extending a certain distance above and below the landing, voltage signals from the car position matrix actuate leveling control mechanism to bring the car back to a level with the landing.

Features and advantages of the invention will be seen from the above, from the following description of the operation of the preferred embodiment when considered in conjunction with the drawings and from the appended claims.

Figure 24:
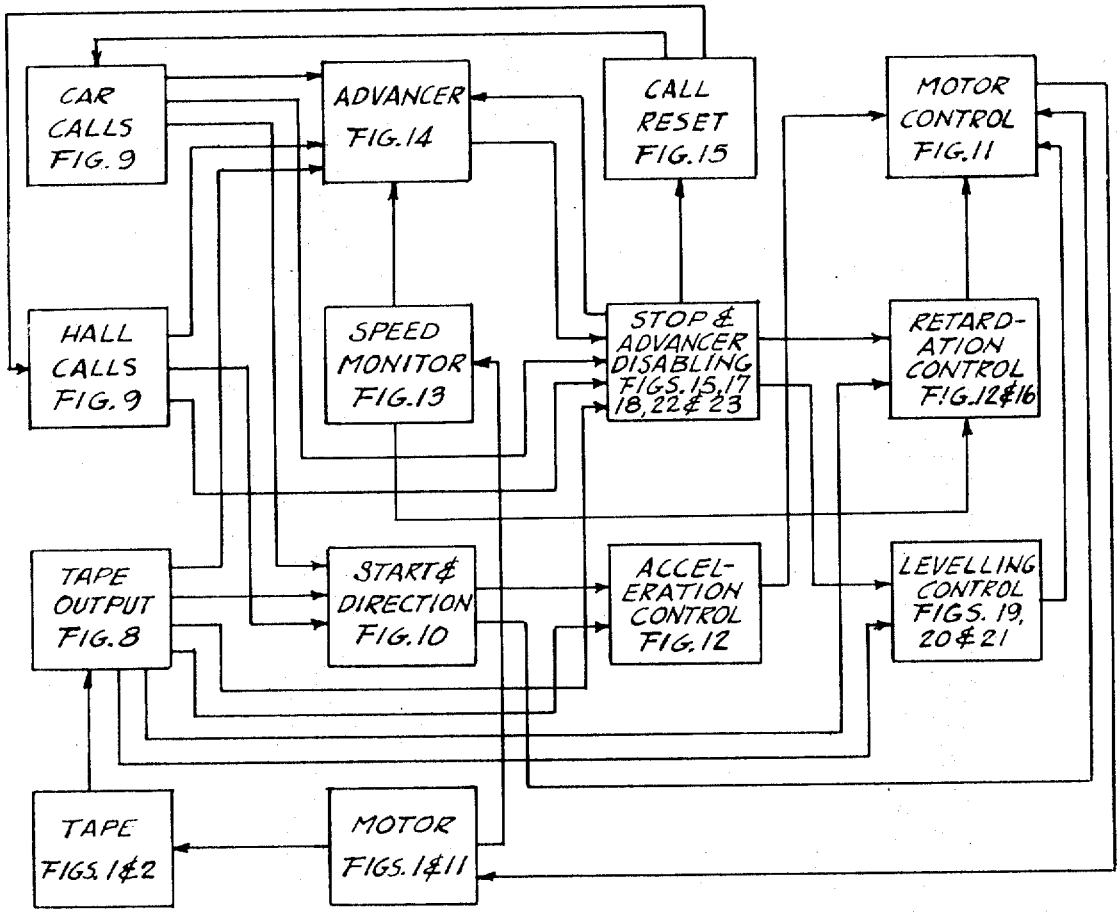
Figure 25:
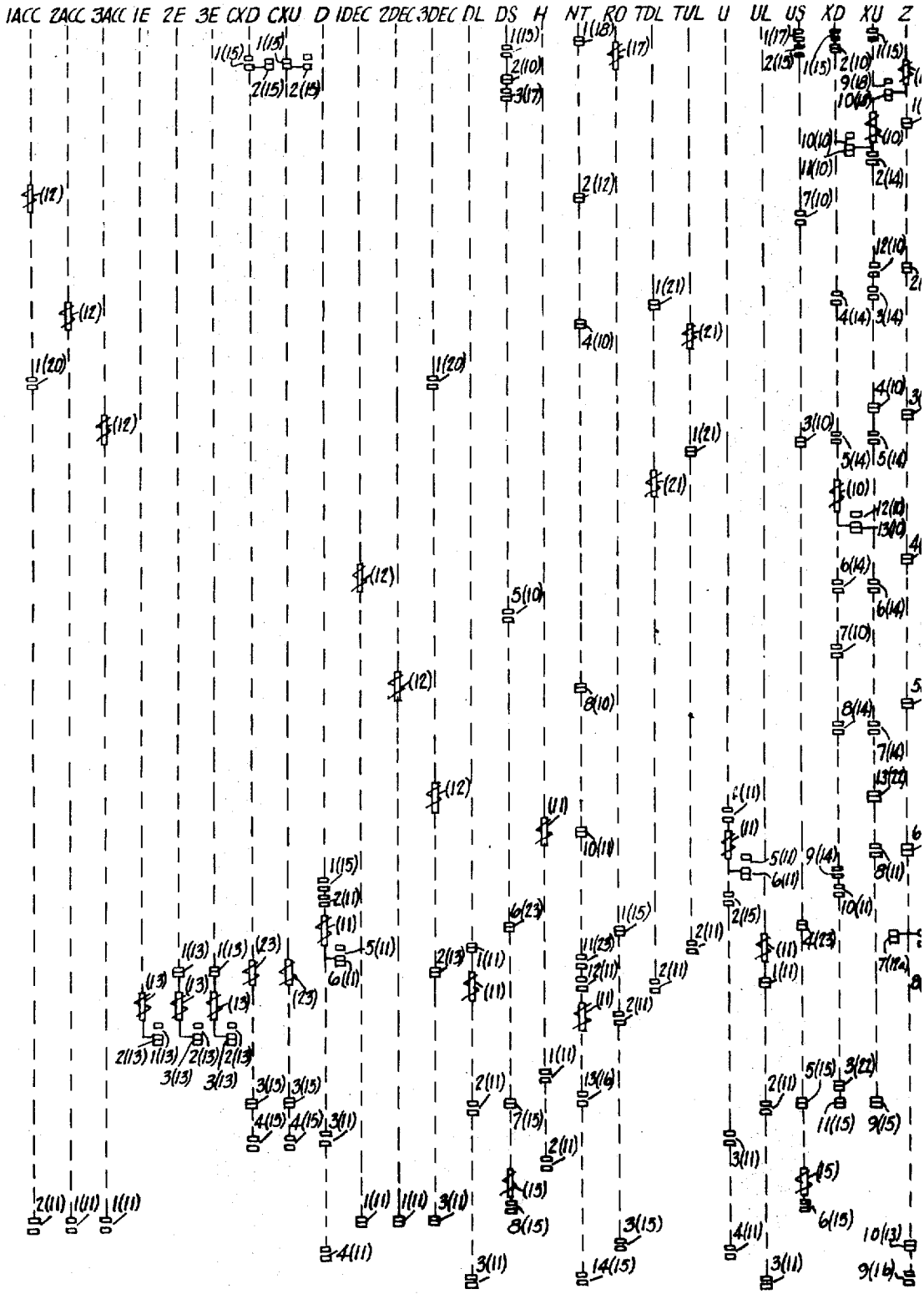

FIG. 24 is a block diagram indicating the operative association of the control elements of the elevator system with each other; and FIG. 25 is a spindle sheet for use in side-by-side alignment with FIGS. 10 through 18, 20, 21 and 23 for locating in such figures the coils and contacts of electromagnetic switches, the number of the figure in which a particular coil or pair of contacts appears being appended, in brackets, to the particular designation of that coil or pair of contacts.

Figure 1:
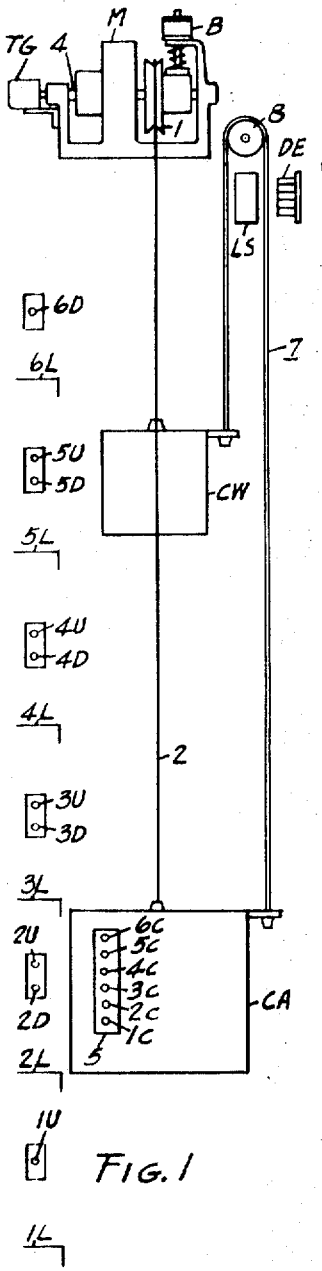
FIG. 1 is a simplified schematic representation of an elevator installation in accordance with the invention.

Referring to FIG. 1, car CA is raised and lowered by means of hoisting motor M, which motor drives a traction sheave 1 over which pass hoisting ropes 2, connecting the car to its counterweight CW. A tachometer generator TG is coupled to the drive shaft 4 of hoisting motor M to produce a voltage output which is proportional in magnitude to the speed of the car. An electromagnetic brake B is provided and is applied to effect the final stopping operation and to hold the car when at rest.

Figure 9:
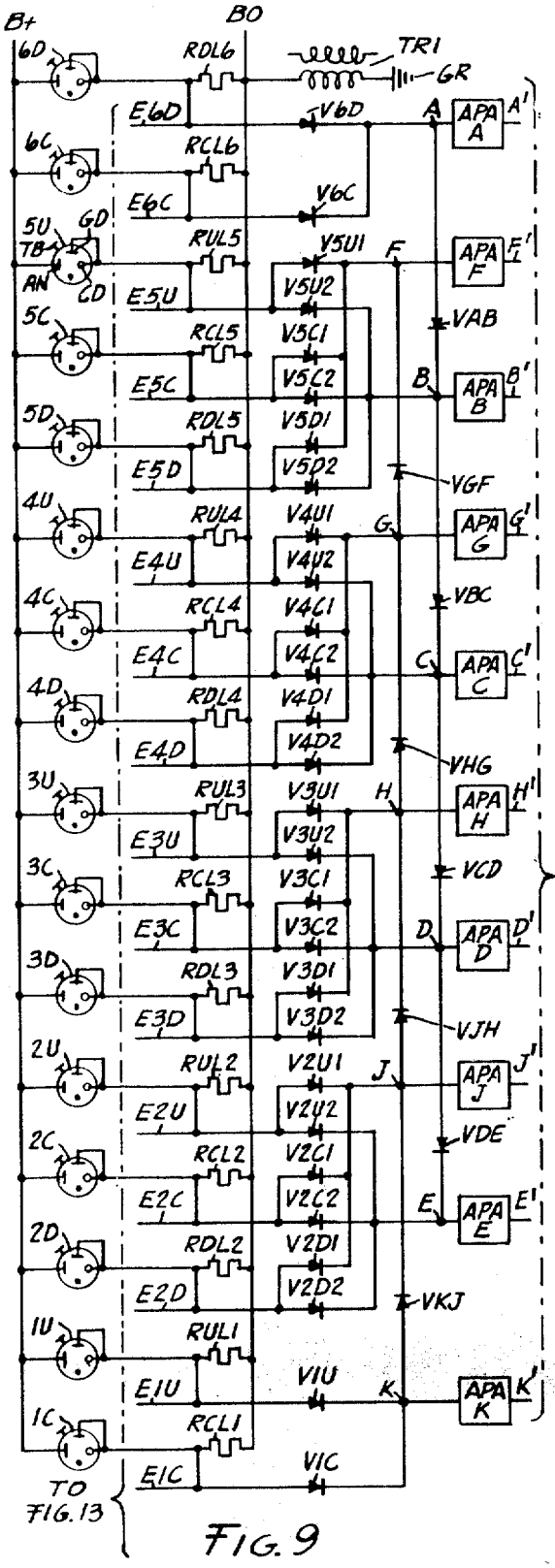
FIG. 9 is a schematic wiring diagram of service demand registering circuits for the elevator of FIG. 1, and includes a portion of the direction control circuits.

For convenience, in the arrangement illustrated, the car has been shown as serving six landings, designated 1L through 6L. Controls are provided at the landings to enable intending passengers to register landing calls, and up control U and a down control D being provided at each intermediate landing and one control at each terminal landing. The car is provided with a car operating panel 5, on which are located a plurality of controls C, one for each landing L, for registering car calls. Prefix numeral designations are applied to the landing call controls U, D and car call controls C to indicate the landings for which they are provided. These call controls will hereinafter be termed landing buttons and car buttons, respectively, and their circuits are shown in FIG. 9 wherein gas tubes of the 1C21 type bear the call button designations.

Means for indicating the position of the car at predetermined points in the hoistway for control purposes are provided, and include a light shield 7 (FIG. 1) in the form of a flat flexible tape of steel or other suitable material. Light shield tape 7 passes over an idler sheave 8 and is connected at its ends to car CA and counterweight CW, respectively, so as to duplicate movement of the car. Mounted stationary in the hoistway adjacent to and on one side of tape 7 is a light source LS. On the opposite side of tape 7 is mounted a container DE in which five photoconductive cells C1 through 5 of the Clairex CL3 type are secured in a row which is skewed upwardly at an acute angle with the horizontal.

Figure 2:
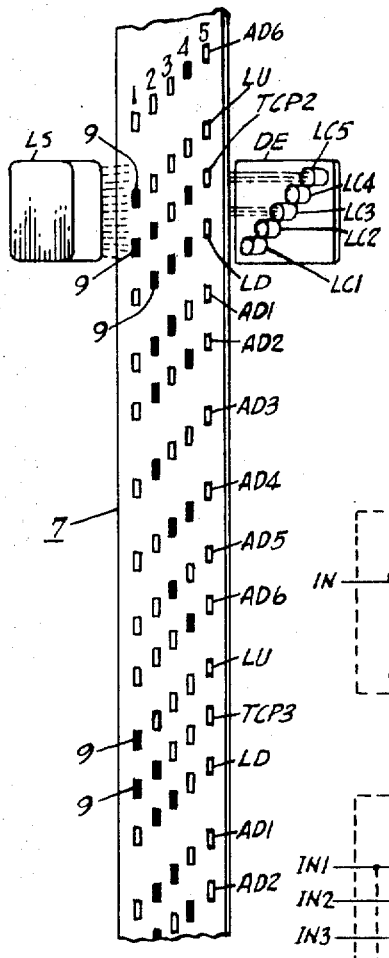
FIG. 2 is a fragmentary schematic representation of an enlarged view in perspective of certain of the control elements of FIG. 1.

As may be seen from FIG. 2, wherein light source LS, cells LC1–5 and a portion of tape 7 for the position of the car at the second landing are illustrated in enlarged fashion, tape 7 is provided with a plurality of slots arranged in horizontally skewed rows of 5, located for alignment with cells LC1–5; the rows of slots being spaced apart along the tape length to correspond to predetermined positions of the car in the hoistway. Slots 1–4 in each row are utilized to code the tape rows according to corresponding positions of the car. The coding is accomplished by applying masking strips 9 of opaque material over certain of the slots 1–4 to obtain rows having various combinations of masked and unmasked slots, in accordance with a predetermined code, such that the particular code combination of each row designates its corresponding car position.

With this arrangement, the possible combinations of masked and unmasked slots 1–4, excluding the condition of all 4 slots being masked, may be expressed by the formula $2^N-1$, yielding 15 code combinations which may be utilized to code the rows of slots to designate corresponding car positions. Only 14 of the possible 15 combinations are used, 1 for each of the 6 landings served, 2 to establish levelling back points a certain distance above and below each landing, and 6 for acceleration and deceleration points positioned at predetermined points between successive landings. For example, the row designated TCP2, corresponding to the position of the car at the second landing, is coded by masking slots 1, 2 and 4, row designated TCP3 for the position of the car at the third landing has slots 1 and 2 masked, while slots 1 in up levelling rows LU and slots 2, 3 and 4 in down leveling rows LD are masked. Acceleration-deceleration rows AD1 have slots 2 and 3 masked, rows AD2 slots 2 and 4, rows AD3 slot 2, etc.

It may be noted that by increasing the number of slots used to code the car positions by one, from 4 to 5, the number of car positions which may be desigated is increased from 15 to 31 (using the aforementioned formula $2^N-1$) so that the subject arrangement may be utilized to indicate the position of a car in a twenty-three landing installation instead of in the six landing installation described herein.

As tape 7 duplicates movement of the car, the coded rows of slots move in sequence into alignment with the photosensitive or light cells, such that light from light source LS passes through the unmasked slots in the row then aligned with the light or photosensitive cells, striking the corresponding photosensitive or light cells (LC1–5) which are activated in response to the light. Slot 5 is made smaller than the others and is left unmasked in each of the rows to serve as a "read out" slot which insures that the code of a row is read only when that row is in proper alignment with cells LC1–5. For example, for the position of the car shown at the second landing 2L, light from light source LS passes through unmasked slots 3 and 5 of row TCP2, striking the corresponding light cells LC3 and LC5. This combination of activated and unactivated light cells, i.e., light cells LC3 and 5 activated and light cells LC1, LC2 and LC4 unactivated, denotes that the car is at the second landing. The manner in which the activation of selected combinations of light cells LC1–4, denoting car position, is utilized in the control system will be described hereinafter.

In lieu of providing the illustrated coded tape arrangement to denote car position, light source LS and light cells LC1–5 may be carried by the car, and light shields; each having certain slots defined therein, according to a predetermined code and denoting a particular position of the car; may be mounted at predetermined points in the hoistway along the path of car travel in position to project between the light source LS and light cells LC1–5, as the car arrives at such points. Alternately, magnetically actuatable switches may be carried by the car and selectively actuated according to a predetermined code by permanent magnets mounted along the path of car travel to produce combinations of actuated and unanctuated switches, denoting car position. Other ararngements for selectively producing certain code combinations, denoting the position of the car, readily suggest themselves and may also be utilized within the scope of this invention.

The electromagnetic switches employed in the control system illustrated are designated as follows:

1ACC—First accelerating switch
2ACC—Second accelerating switch
3ACC—Third accelerating switch
CXD—Down call reversal switch
CXU—Up call reversal switch
D—Down switch
1DEC—First decelerating switch
2DEC—Second decelerating switch
3DEC—Third decelerating switch
DL—Down leveling switch
DS—Down stopping switch
1E—First speed switch
2E—Second speed switch
3E—Third speed switch
H—Brake switch
NT—Stop time switch
RO—Stop switch
TDL—Auxiliary down leveling switch
TUL—Auxiliary up leveling switch
U—Up switch
UL—Up leveling switch
US—Up stopping switch
XD—Down direction memory switch
XU—Up direction memory switch
Z—Advancer disabling switch In the circuits which will be described, the foregoing identifying letters and prefix numerals are applied to the coils of the electromagnetic switches and, with reference numerals appended thereto, are applied to the contacts of the switches to differentiate between different sets of contacts on the same switch, all contacts being shown for the unoperated condition of the switches.

Condensers are generally designated C, resistors R, silicon diodes V and tubes T (except the call button tubes U, D and C of FIG. 9), prefix and suffix letters and/or numerals being appended thereto to differentiate similar circuit elements from each other. All tubes T are gas tetrodes of the 5727 type, connected as triodes, and all silicon diodes V are of the 1N1693 type.

Power is supplied to the circiuts from sources (not shown); direct power being supplied over supply lines B+, B1+, B2+, B− and B0, and alternating power over supply line AC; B0 acting as a common ground for both alternating and direct power.

In order to render the circuits more readily understandable, they are arranged in separate figures having to do with certain control operations and the interconnections between figures are indicated by giving the wires in those figures from which voltages are taken and the wires in those figures to which these voltages are applied the same designating characters. In addition, the wires in those figures from which the voltages are taken are indicated as going to the figures to which the voltages are applied by means of "lead brackets," bearing the interconnecting figure designations, while the designating characters of the wires in those figures to which voltages are applied have appended numbers in brackets, indicating the figures in which the source voltages appear. For example, the source voltage wires A′ to K′, appearing in FIG. 9, are indicated by a lead bracket as applying the source voltages to FIGS. 10 and 22, while the bracketed numeral suffix (9) affixed to wires A′ to K′ in FIG. 10 indicates that these wires are connected to the respective source wires A′ to K′ in FIG. 9. This avoids the mass of interconnecting wires which would be present if the circiuts were arranged in a single figure on several sheets of drawings and the interconnections made between these sheets, and yet enables the connections to be readily ascertained. In some figures, connection from a source voltage wire is made at more than one point. When the cross-connections of wires to indicate such multiple connections would make the circuits less readily followable, such cross-connections have not been made, but the wires are given the same designation. As an example, reference may be made to FIG. 12 where the connecting together of all the EXU (10) wires, all the ACC (12a) wires, all the DEC (12a) wires, all the EXD (10) wires, etc. would involve a considerable amount of crossing of wires and thus complicate the readability of the circuits.

Figure 3:
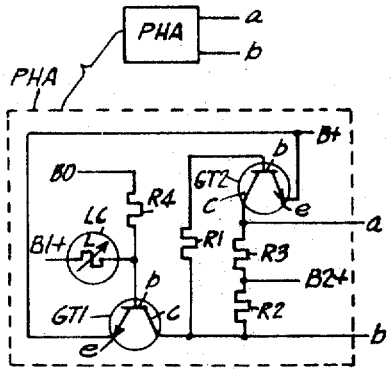
FIG. 3 is a schematic wiring diagram of a photoconductive switch operable in response to light, and a block symbol which will be used to indicate the switch in circuits in which it occurs.

For the sake of clarity and brevity certain circuit arrangements which are utilized in several instances in the control circuits which follow have been illustrated, as individual circuits, in FIGS. 3 through 7, each circuit arrangement being shown within a broken line outline bearing identifying letter designations. In the control circuits in which these various circuit arrangements are used, they are each represented by a block symbol, having appropriate interconnecting wires, and bearing the letter designation corresponding to the circuit arrangement represented, with pefix and suffix letters and/or numerals being appended thereto to differentiate similar circuit arrangements from each other. For example, the circuit arrangement of FIG. 3, the broken line outline of which is designated PHA, is represented by block symbol PHA, having output wires a, b, as shown in FIG. 3, and in the circuits of FIG. 8, wherein it is used five times, is represented by the block symbols designated PHA1 through PHA5.

FIG. 3 illustrates circuitry for obtaining an output signal at either of output wires a or b in accordance with the response to light of a photoconductive cell LC, one such circuit being provided for each of the light cells LC1–5 of FIG. 2. Transistors GT1, GT2 are of the General Electric 2N167 type, each having base b, emitter e and collector c electrodes, the emitter electrodes being connected in common to supply line B+ which is at substantially zero potential. The collector electrode c of transistor GT1 is connected through resistor R1 to the base electrode b of transistor GT2 and through resistor R2 to supply line B2+. The collector electrode c of transistor GT2 is connected through resistor R3 to supply line B2+. The base electrode b of transistor GT1 is connected through resistor R4 to supply line B0 and through photoconductive cell LC to supply line B1+. Output wires a and b are connected directly to collector electrode c of transistor GT2, GT1, respectively.

Photoconductive cell LC, as has been previously stated, is of the Clairex CL3 type, and is of relatively high resistive impedance, which impedance decreases appreciably in response to light striking the cell. When power is applied to the circuits of FIG. 3, current flows in the base circuit of transistor GT1 from supply line B1+ through photoconductive cell LC and base resistor R4 to supply line B0. The ohmic value of base resistor R4 is selected relative to the impedance of cell LC such that, under conditions where photoconductive cell LC is shielded from light, approximately the entire potential applied across the base circuit appears across cell LC, while only a relatively small positive potential appears across base resistor R4. This relatively small potential is of insufficient magnitude to bias the base electrode b of transistor GT1 sufficiently positive with respect to its emitter electrode e to cause conduction through its emitter-collector circuit. Thus, with cell LC shielded from light, transistor CT1 is prevented from conducting through its emitter-collector circuit and the applied potential of supply line B2+ appears at output wire b as an output signal. The base electrode b of transistor GT2 is biased from supply line B2+ through resistors R2, R1 sufficiently positive with respect to its emitter-electrode e to cause transistor GT2 to conduct through its emitter-collector circuit, extending from supply line B2+ through resistor R3 to supply line B+. Transistor GT2, when in conducting condition, has an extremely low internal impedance, causing substantially a zero voltage drop to appear across its emitter-collector electrodes, and in turn at output wire a. In effect, transistor GT2, when conducting, acts as a "current sink" in that it provides an extremely low impedance path to current flow from output wire a to supply line B1+ for signals of positive polarity applied to output wire a, for purposes to be explained hereinafter.

Under conditions where light strikes photoconductive cell LC, the impedance of the cell decreases appreciably, causing an increase in current flow in the base circuit of transistor GT1, extending through cell LC and base resistor R4. This increased current flow causes a positive potential to appear across base resistor R4 of a magnitude to bias the base electrode b of transistor GT1 sufficiently positive with respect to its emitter electrode e to cause it to conduct through its emitter-collector circuit, extending from supply line B2+ through resistor R2 to supply line B+. As transistor GT1 conducts, its internal impedance decreases to near zero, causing substantially zero potential to appear across its emitter-collector electrodes. This substantially zero potential at the collector electrode c of transistor GT1 causes a reduction of the positive bias formerly applied by way of resistors R2, R1 to base electrode b of transistor GT2. This reduction is sufficient to cause base electrode b to become slightly negative with respect to its associated emitter electrode e, thereby causing transistor GT2 to cease conducting through its emitter-collector circuit. With the transfer of conduction from transistor GT2 to transistor GT1, substantially zero potential appears at output wire b, which is connected directly to the collector electrode c of conducting transistor GT1; while the potential of supply line B2+ appears at output wire a, connected directly to the collector electrode c of transistor GT2. When photoconductive cell LC is again shielded from light, conduction is transferred from transistor GT1 back to transistor GT2, causing the potential of line B2+ to appear again at output wire b, while substantially zero potential appears at output wire a.

In summary, the circuitry of FIG. 3 comprises a photoconductive switch, actuatable, in response to light striking light cell LC, from a first condition to a second condition, and, when light cell LC is again shielded from light, back to its first condition. With cell LC shielded from light, the potential of supply line B2+ appears at output wire b, while a low impedance path is provided from output wire a to line B+ through the emitter-collector circuit of transistor GT2 (then in conducting condition). When light strikes cell LC, the potential of supply line B2+ is transferred from output wire b to a, while a low impedance path is provided from output wire b to line B+ through the emitter-collector circuit of transistor GT1 (then in conducting condition).

Figure 4:
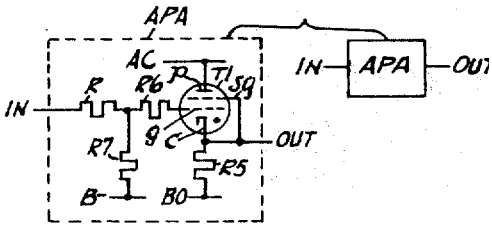
FIG. 4 is a schematic wiring diagram of a power amplifier utilized in certain of the circuits, and a block symbol which will be used to indicate the amplifier in circuits in which it occurs.

FIG. 4, illustrates circuitry for power amplification of an input signal to obtain a pulsating direct current output signal. Tube T1 is a gas thyratron of the 5727 type, having cathode c, grid g, plate p and suppressor sg electrodes, the suppressor sg and cathode c electrodes being connected together. Plate electrode p is connected by supply line AC to an alternating power source (not shown) while cathode electrode c is connected through cathode resistor R5 to supply line B0. Grid electrode g is connected through grid resistors R6, R7 to supply line B—.

With power applied to the circuits of FIG. 4 and in the absence of an input signal at the grid circuit of tube T1, the grid electrode g is biased sufficiently negative with respect to the cathode electrode c to maintain tube T1 in non-conducting condition. Application to the grid circuit of tube T1 of an input signal of sufficient positive polarity to overcome the applied negative grid bias causes tube T1 to fire and conduct on positive half cycles of the applied alternating plate voltage, conduction taking place through its cathode plate circuit, extending through cathode resistor R5. An amplified output signal is obtained from across cathode resistor R5 in the form of pulsating direct current. Upon removal of the input signal, tube T1 returns to non-conducting condition on the next succeeding negative half cycle of the applied plate voltage, removing the amplified output signal.

Figure 5:
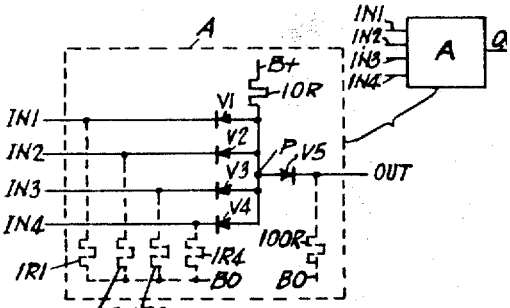
FIG. 5 is a schematic wiring diagram of an "And" circuit element representative of various "And" elements used in certain of the circuits, and a block symbol to indicate the "And" elements in circuits in which they occur.

FIG. 5 illustrates a circuit for obtaining an output signal only under circumstances where all of a plurality of input signals or conditions are simultaneously present, commonly termed an "And" circuit. For convenience, the circuit has been illustrated as having four inputs 1N1–4, it being understood that similar "And" circuits having a lesser or greater number of inputs may be utilized in the circuits which follow. Each input wire (1N1–4) is connected through a blocking input diode (V1–4) to a common junction point P, which point in turn is connected through line resistor 10R to supply line B+. Output wire 0 is connected through blocking output diode V5 to common junction point P and through output resistor 100R to supply line B0. An input resistor (1R1–4) is provided for each input wire (1N1–4) and connects the left side of the associated input diode (V1–4) to supply line B0. The blocking diodes V1–5 act to electrically isolate the input circuits from the output circuits and from each other. Input resistors 1R1–4 and output resistor 100R have been shown as part of the circuitry of FIG. 5 merely to aid in the explanation of its operation. In actual practice, these resistors 1R1–4, 100R form part of the respective input and output circuits to which the And circuit is interconnected.

For purposes of explanation, let it be assumed that line resistor 10R has an ohmic value ten times greater than input resistors (1R1–4), while output resistor 100R has an ohmic value 100 times greater than the input resistors (1R1–4). With such an arrangement and in the absence of applied input signals to wires 1N1–4, substantially all of the line current flows from supply line B+ through the paths of least resistance, extending through line resistor 10R, input diodes V1–4 and their corresponding input resistors 1R1–4 to supply line B0, only a relatively minute portion of the line current flowing through output resistor 100R. Under such conditions, substantially no potential appears across output resistor 100R so that the And circuit effectively does not produce an output signal. This is so, since in the absence of input signals to the And circuit and with resistors 10R, 1R1–4 and 100R having the aforementioned ohmic portions relative to each other, each current input path from supply line B+ to supply line B0 through input diodes V1–4 and their respective associated input resistors 1R1–4 offers an extremely low impedance path to current flow relative to the impedance path available through output resistor 100R. Thus, each individual input path to supply line B0 acts as a "current sink" for current flow from supply line B+; the existence of only one such low impedance input path being sufficient to substantially prevent current flow in the output circuit and the production of an output signal from the And circuit.

The application of a blocking signal to any one of the input wires 1N1–4 of the And circuit acts to "block" the flow of current from supply line B+ through the input diode (V1–4) and resistor (1R1–4) associated with the input wire to which such signal is applied. For example, the application of a signal of positive polarity, say, to input wire 1N1, which signal is of a magnitude to raise the potential at the left side or input diode V1 with respect to the potential at its right side sufficiently to prevent substantially current flow from supply line B+ through input diode V1, and resistor R1, effectively "blocks" the low impedance path through input diode V1 to supply line B0. However, so long as a blocking signal is absent at any one of the input wires 1N1–4, at least one path of low impedance exists from supply line B+ to supply line B0 through the input diodes (V1–4) and resistors (1R1–4), thereby substantially preventing current flow through output resistor 100R and, consequently, the production of an output signal from the And circuit. For example, in the absence of a blocking signal to input wire IN3, while blocking signals are applied to input wires 1N1, 2 and 4, substantially the entire current flow from supply line B+ is through the low impedance input path extending through input diode V3 and input resistor 1R3 to supply line B0, thereby effectively preventing the production of an output signal across output resistor 100R and from the And circuit.

Under conditions where all inputs to the And circuit are "blocked" simultaneously (i.e., signals of positive polarity and sufficient magnitude are applied to all of the input circuits simultaneously so as to "block" all the paths of low impedance to current flow from supply line B+ through input diodes V1–4), all of the input conditions to the And circuit are said to be simultaneously present and current flows from supply line B+ through line resistor 10R, output diode V5 and output resistor 100R to supply line B0, causing an output signal to appear across output resistor 100R and from the And circuit. As soon as any one of the blocking signals or input conditions is removed, current will again flow through the low impedance input circuit to supply line B0, and substantially cease to flow through output resistor 100R, again effectively removing the output signal from the And circuit.

It is to be understood that in lieu of applying blocking signals to "block" the low impedance input paths, the input circuits may be "blocked" and the input condition supplied by interrupting the circuits from supply line B+ to supply line B0 through input diodes V1–4 and resistors 1R1–4. For example a pair of normally closed switch contacts (not shown) may be inserted in circuit between input resistor 1R1 and input diode V1, and actuated to open condition to interrupt the path of low impedance to current flow through such input circuit, thereby "blocking" that input and supplying the input condition without the application of a blocking signal to input wire 1N1. Such an arrangement is utilized in And circuit AD (FIG. 18) wherein a low impedance input path via wire EYD through normally engaged contacts XU13 (FIG. 22) and the collector-emitter circuit of transistor GT3 (when conducting), as will hereinafter be described, may be interrupted by the actuation of contacts XU13 to separated condition, thereby effectively applying a blocking signal to And circuit AD.

In summary, an input path may be said to be "blocked" when a positive potential of a certain magnitude is applied to the left-hand side of its associated input diode (VI–4), or when its input diode is disconnected at its left side from line B0, even though no potential is applied to the left-hand side of such input diode. Therefore, in the description which follows, such input paths under such conditions will be referred to as "blocked." Under opposite conditions, where the input path to line B0 is a low impedance one, the input path will be referred to as "unblocked."

Figure 6:
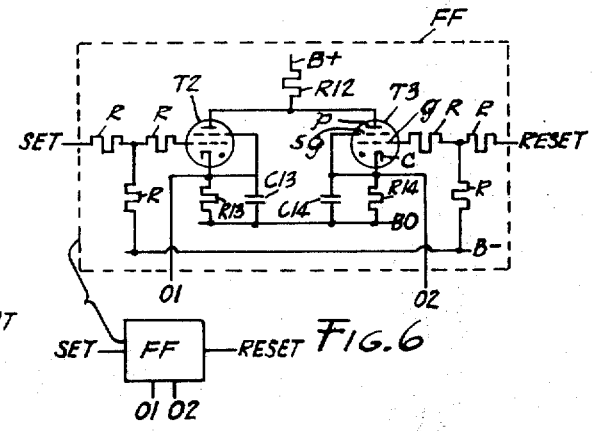
FIG. 6 is a schematic wiring diagram of a flip-flop utilized in certain of the circuits, and a block symbol to indicate the flip-flop in circuits in which it occurs.

FIG. 6 illustrates a flip-flop circuit which, in response to "set" and "reset" input signals, provides an output signal over either of output wires 01 or 02. Gas tubes T2 and T3, of the 5727 type, are connected as triodes and have their plate electrodes p connected through a common plate resistor R12 to supply line B+. The cathode electrode c of tube T2 is connected through a cathode circuit, consisting of resistor R13 connected in parallel with condenser C13, to supply line B0, while the cathode electrode c of tube T3 is similarly connected to supply line B0 through the parallel resistor-capacitor R14, C14 circuit.

When power is applied to the flip-flop circuit, the grid electrodes g of both tubes are biased from supply line B— sufficiently negative with respect to their respective cathode electrodes c to maintain the tubes in nonconducting condition. The application to the grid circuit of tube T2 of a "set" signal of positive polarity and sufficient magnitude to counteract the applied negative grid bias causes that tube to fire and conduct through its cathode-plate circuit, extending through common plate resistor R12 and the parallel resistor-capacitor R13, C13 circuit. The applied plate voltage is of sufficient magnitude, such that once conduction of the tube is initiated, it is maintained in conducting condition after the "set" signal is removed. The ohmic value of cathode resistor R13 is selected relative to the value of plate resistor R12 such that the largest portion of the applied plate voltage appears across cathode resistor R13, and in turn, at output wire 01. Once conduction is initiated, the potential across tube T2 remains constant, and cathode condenser C13 charges to the potential appearing across its parallel cathode resistor R13.

Next assume that "reset" signal is applied to the grid circuit of tube T3, which "reset" signal is of positive polarity and sufficient magnitude to cause tube T3 to fire and conduct through its cathode-plate circuit, extending through common plate resistor R12 and the parallel resistor-capacitor R14, C14 circuit. As tube T3 conducts, the impedance to the applied plate voltage decreases, causing an increase in current flow through common plate resistor R12 with a consequent increase in the potential appearing across that resistor. Conduction through tube T3 also causes a potential to develop across its cathode resistor R14, which potential appears at output wire 02. Condenser C14 in parallel with cathode resistor R14 charges to this potential. However, since the charge on condenser C13 in the cathode circuit of tube T2 cannot change instantaneously, the increase in the potential appearing across common plate resistor R12 in the tube plate circuit (due to the conduction of tube T3) causes the potential appearing across tube T2 to decrease below the sustaining value of the tube, which then ceases to conduct. As tube T2 ceases to conduct, condenser C13 discharges through cathode resistor R13 to supply line B0, causing the removal of the output signal at wire 01. At the same time, the current through common plate resistor R12 and, in turn, the potential appearing across that resistor decreases to its previous value. This decrease causes a slight increase in the potential appearing across resistor R14 in the cathode circuit of tube T3 to which increased potential condenser C14 charges, and which potential appears at output wire 02. The application of a subsequent "set" signal to the grid circuit of tube T2 similarly transfers conduction from tube T3 back to T2, causing in turn the transfer of the output signal from output wire 02 back to output wire 01. In this manner, the flip-flop circuit of FIG. 6, in response to "set" and "reset" input signals produces an output signal at either output wire 01 or 02, depending upon which input signal is applied.

Figure 7:
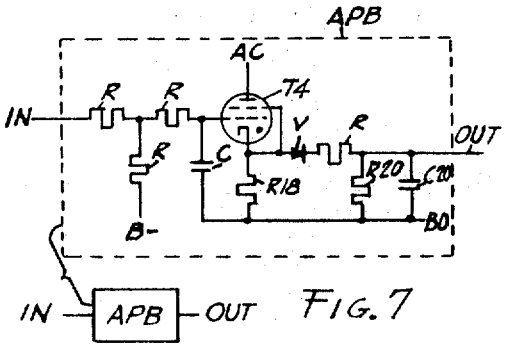
FIG. 7 is a schematic wiring diagram of another form of power amplifier utilized in certain of the circuits, and a block symbol to indicate the amplifier in circuits in which it occurs.

FIG. 7 illustrates circuitry for power amplification of an input signal to obtain a filtered, direct current output signal. Gas tube T4 of the 5727 type is connected as a triode. An alternating voltage is applied over supply lines AC, B0 to its plate-cathode circuit which includes cathode resistor R18. A negative bias is applied over supply lines B—, B0 to the grid-cathode circuit of tube T4, which bias, in the absence of an input signal, is of sufficient magnitude to maintain the tube in nonconducting condition. The application of an input signal across the grid-cathode circuit of tube T4 of sufficient positive polarity to overcome the applied negative grid bias causes the tube to fire and conduct on positive half cycles of the applied plate voltage, conduction taking place through its cathode-plate circuit, extending through cathode resistor R18. An amplified output signal is obtained from across cathode resistor R18, and is filtered through the tank circuit, consisting of resistor R20 and capacitor C20 to provide a signal of filtered direct current character.

Figure 8:
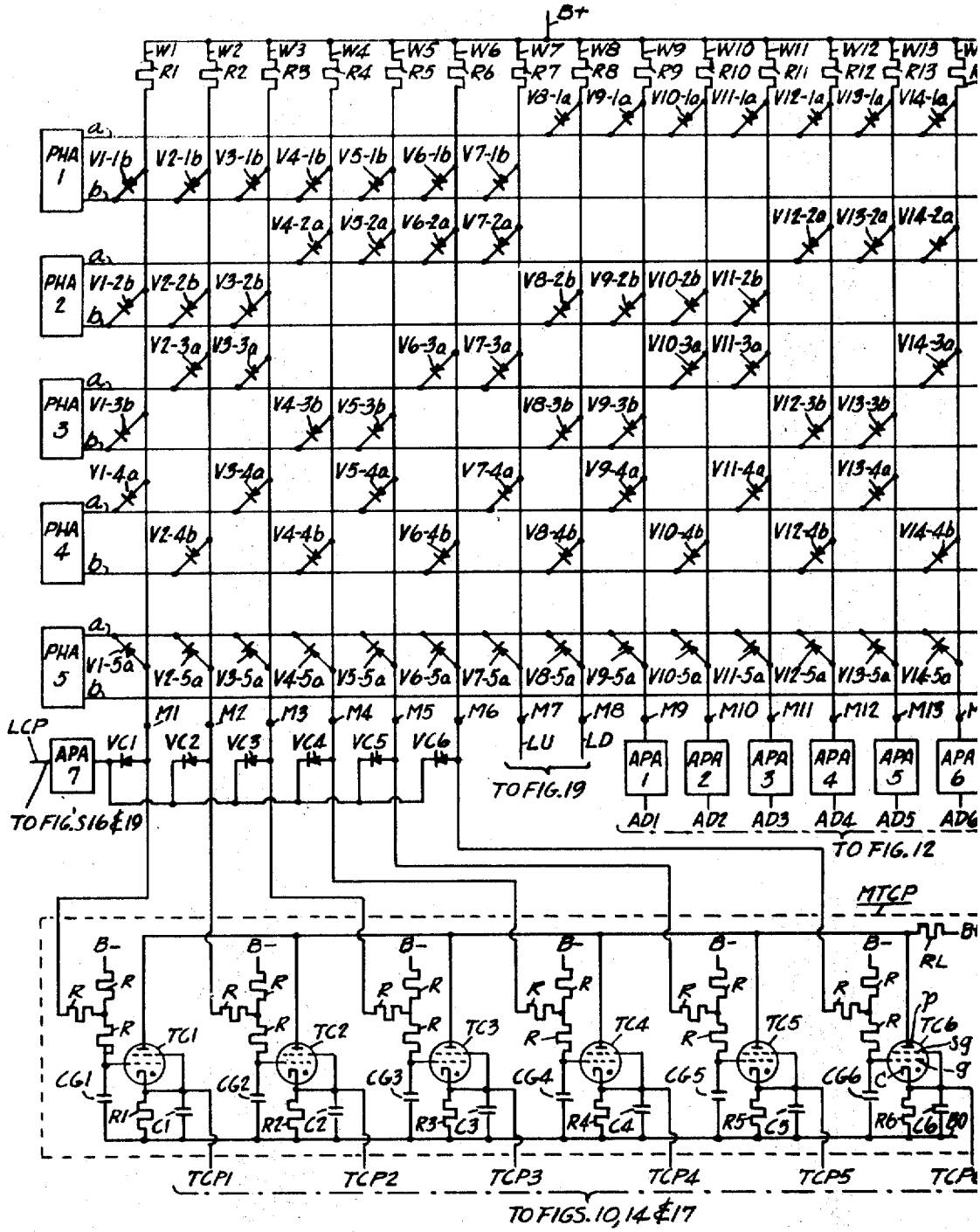
FIG. 8 is a schematic wiring diagram of car position translating and memory circuits.
Figure 13:
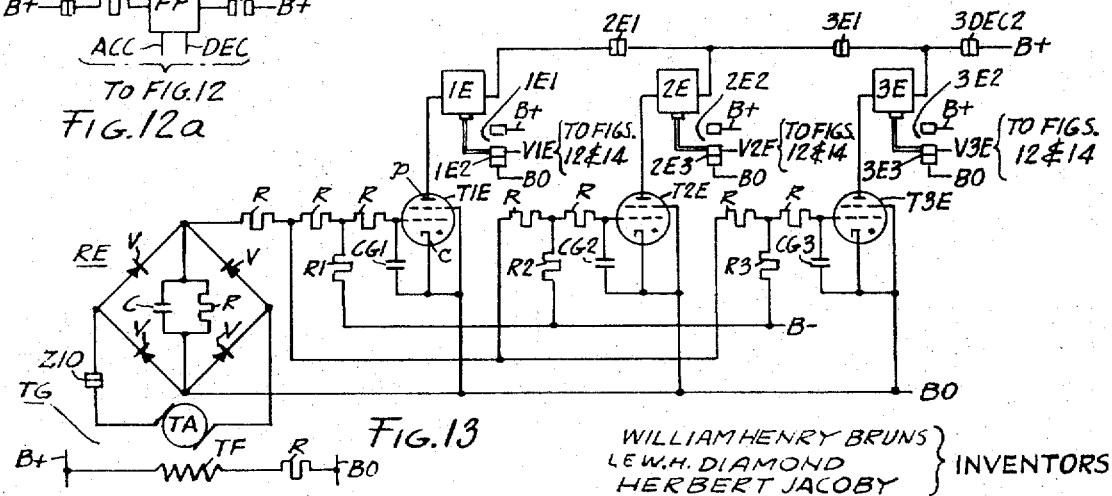
FIG. 13 is a schematic wiring diagram of the circuits of the tachometer generator TG of FIG. 1, and includes circuitry for indicating the speed of the car in terms of voltage in accordance with the voltage output of the tachometer generator.

FIGS. 8, 9 and 13 illustrate circuitry for obtaining information regarding the movement of the car and the demand for service in terms of voltage for use as input signals to logic circuitry which controls the car movement in response to the service demand.

FIG. 8 shows circuitry for translating the aforementioned code of the rows of slots on tape 7 (FIGS. 1 and 2), which coded rows correspond to the aforementioned preselected positions of car CA in the hoistway, into voltage output signals, corresponding to such preselected car positions, as the car in its movements coincides with such positions. The code translating circuitry of FIG. 8 includes five photoconductive switches PHA1–5, shown as block symbols representative of the previously described switch circuit of FIG. 3, one switch being provided for each of the light cells LC1–5 of FIG. 2. A matrix is provided in FIG. 8 and consists of the output wires a, b of photoconductive switches PHA1–5, connected at certain points by means of matrix blocking diodes, generally designated V, to line wires W1–14, one end of which line wires is connected through line resistors R1–14, respectively, to supply line B+. The other ends of line wires W1–14 terminate in matrix output terminals M1–14, corresponding to the aforementioned predetermined positions of the car in the hoistway; terminals M1–6 corresponding to the position of the car at landings 1L–6L, respectively; terminals M7, M8 to the position of the car at a certain leveling back distance below and above, respectively, a landing, and terminals M9–14 to the position of the car at certain acceleration-deceleration points between adjacent landings. As will be described hereinafter, the circuit arrangement is such that the appearance of a signal at a matrix output terminal (M1–14) indicates that the car is at the hoistway position corresponding to such terminal.

Matrix output terminals M9–14 are connected directly to the respective inputs of amplifiers APA1–6, shown as block symbols representative of the previously described amplifier circuit of FIG. 4, for amplification of signals appearing at such matrix output terminals. Matrix output terminals M1–6 are connected through blocking diodes VC1–6, respectively, to the input of amplifier APA7 for amplification of their respective signals and, in addition, are connected to the grid circuits of tubes TC1–6, respectively, of a true car position memory circuit, shown in broken line outline and generally designated MTCP.

Tubes TC1–6 of the true car position memory circuit are of the gas diode 5727 type, connected as triodes and have their plate electrodes p connected through common plate resistor RL to supply line B+. The cathode circuit of each tube (TC1–6) consists of a parallel resistor-capacitor (R1C1–R6C6) circuit, connecting its associated cathode electrode c to supply line B0. In the absence of input signals to the grid circuits of tubes TC1–6 from matrix output terminals M1–6, respectively, the tubes are baised to nonconducting condition over supply line B−, connected to their respective grid circuits. Grid capacitors CG1–6 are provided for noise filtration.

In recapitulation of the operation of photoconductive switches PHA1–5, it may be recalled that, under conditions where photoconductive light cell LC (FIG. 3) is shielded from light, the potential of supply line B2+ appears at output wire b, while a low impendance path is provided from output wire a (through transistor GT2 in conducting condition) to supply line B1+, which low impedance path acts as a "current sink" to signals of positive polarity applied to output wire a. This may be termed the unoperated condition of the photoconductive switch. When light strikes light cell LC, the photoconductive switch may be said to be actuated to operated condition, potential B2+ being transferred from output wire b to a, while an extremely low impedance path or "current sink" is provided for signals of positive polarity applied to output wire b, the path extending from output wire b through transistor GT1 (in conducting condition) to supply line B1+.

Photoconductive switches PHA1–5 are utilized in the circuitry of FIG. 8 to provide either a low impedance path for current flow from supply line B+ over line wires W1–14 through their respective line resistors R1–14 and the matrix blocking diodes V, interconnecting line wires W1–14 to output wires a, b of the photoconductive switches, or to block such current flow through the matrix diodes. Current flow through matrix blocking diode V may be said to be blocked when either of the output wires a or b of the photoconductive switches apply the aforementioned potential of supply line B2+ (FIG. 3) to the left side of the matrix diode. Current flow through a matrix diode V (FIG. 8) may be said to be unblocked under conditions where either of the outut wires a or b of the photoconductive switches present a "current sink" at the left side of the matrix diode. Under conditions where any one of the interconnecting matrix blocking diodes V of a line wire (W1–14) is unblocked, substantially all of the current flow from supply line B+ and through the line resistor (R1–14) associated with such line wire (W1–14) is through such unblocked matrix diode V, effectively preventing the appearance of a signal at the matrix output terminal (M1–14) of that line wire. Only under conditions where all the matrix blocking diodes V of a line wire (W1–14) are blocked does a signal appear at the output terminal (M1–14) of such line wire. The matrix blocking diodes V, interconnect line wires W1–14 with output wires a, b of the photoconductive switches in such a manner that a signal appears at the matrix output terminals (M1–14) only when the position of the car coincides with the predetermined points (previously described) in the hoistway, which points correspond to the matrix output terminals.

Under conditions where the car coincides with such a point, the coded row of slots on tape 7 (FIG. 2), corresponding to that car position, is, by car movement, brought into alignment with light cells LC1–5. Light passing through the unmasked slots in such aligned row strikes the corresponding light cells, selectively actuating their associated photoconductive switches (PHA1–5), thereby providing a specific combination of operated and unoperated photoconductive switches PHA1–5 (FIG. 8). This combination blocks all of the matrix diodes V, interconnecting the line wire (W1–14) whose output terminal (M1–14) corresponds to the car position, causing an output signal to appear at the matrix output terminal (M1–14) of such line wire, thereby indicating the position of the car in the hoistway.

For example, for the position of the car at the second landing 2L, coded tape row TCP2 (FIG. 2) is in alignment with light cells LC1–5, causing light passing through unmasked slots 3 and 5 to strike light cells LC3, LC5. Under such conditions, photoconductive switches PHA3 and 5 (FIG. 8) are activated to operated condition, applying the blocking potential of supply line B2+ (FIG. 3) to the left side of the matrix diodes V (FIG. 8) connected to their respective switch output wires a, and present low impedance paths to current flow through the matrix diodes V connected to their respective output wires b. Photoconductive switches PHA1, 2 and 4, associated with light cells LC1, 2 and 4, which cells are shielded from light, remain in unoperated condition. In such condition, photoconductive switches PHA1, 2 and 4 provide a blocking potential to the left side of the matrix blocking diodes V connected to their respective output wires b, while presenting low impedance paths to current flow through the matrix diodes V connected to their respective output wires a.

Under the aforementioned operated and unoperated conditions of photoconductive switches PHA1–5, by looking at the matrix arrangement of FIG. 8, it is seen that low impedance paths are provided by output wires a, b of the photoconductive switches for current flow from supply line B+ over all of the line wires W1–14, except line wire W2, thereby preventing an output signal from appearing at matrix output terminals M1, M3–14. For example, output wire a of photoconductive switch PHA1 presents a low impedance path for current flow from line wires W8–14 through matrix diodes V8–1a to V14–1a, effectively preventing a signal output appearing at matrix output terminals M8–14; output wire a of photoconductive switch PHA2 presents a path of low impedance for current flow from line wires W4–7, through matrix diodes V4–2a to V7–2a, effectively preventing output signals appearing at matrix output terminals M4–7, and output wire a of photoconductive switch PHA4 allows substantially all the current flow from line wires W1 and W3 to flow through matrix diodes V1–4a, V3–4a, respectively, effectively preventing the appearance of an output signal at matrix output terminals M1 and M3. On the other hand, the only path provided for current flow from supply line B+ over line wire W2 is through line resistor R2 to output terminal M2; the paths through matrix diodes V2–1b, V2–2b, V2–3a, V2–4b and V2–5a all being blocked by the aforementioned conditions of photoconductive switches PHA1–5 for the position of the car at the second landing 2L. Thus, a signal appears at matrix output terminal M2, indicating that the car is at the second landing.

Similarly, for the position of the car at other of the predetermined points in the hoistway, light passing through the unmasked slots of the coded tape rows, corresponding to such points, selectively actuates photoconductive switches PHA1–5 to block the matrix diodes V of the line wires (W1–14) whose output terminals (M1–14) correspond to the position of the car at such points, thereby selectively causing output signals to appear at output terminals (M1–14) in accordance with the position of the car at such points. In this manner, the tape code is translated into voltage signals which appear at the matrix terminals (M1–14), corresponding to certain positions of the car, for application to the inputs of car control circuitry, as will be later described.

The true car position memory circuit MTCP portion of FIG. 8 is utilized to remember the position of the car at a landing until the car, in traveling, arrives at the next succeeding landing. For example, for the position of the car at the second landing 2L, the signal appearing at matrix output terminal M2 is applied to the grid circuit of tube TC2 of memory circuit MTCP. This signal counteracts the applied negative grid bias of the tube sufficiently to cause it to fire and conduct through its cathode-plate circuit, extending from supply line B+ through common plate resistor RL, tube TC2 and the parallel resistor-capacitor R2, C2 cathode circuit to supply line B0. As current flows through the cathode-plate circuit of tube TC2, voltage drops appear across plate resistor RL and cathode resistor R2. Cathode capacitor C2 charges to the potential appearing at the cathode electrode c of the tube, which potential appears at output wire TCP2, indicating the position of the car at the second landing.

Next assume that the car travels toward the third landing. As the car leaves the second landing, tape 7 (FIGS. 1 and 2) follows the car movement, moving unmasked slots 3 and 5 of coded tape row TCP2 out of alignment with light cells LC3 and 5, thereby shielding them from light. Photoconductive switches PHA3 and 5 (FIG. 8), associated with formerly unshielded cells LC3 and 5, return to unoperated condition, removing the blocking signals from the left-hand side of matrix blocking diodes V2–3a, V2–5a, respectively, thereby causing the removal of the signal appearing at matrix output terminal M2 and the grid of memory tube TC2. However, the plate voltage applied to memory tube TC2 is of sufficient magnitude to maintain it in conducting condition, notwithstanding removal of the firing signal from its grid circuit. Thus, tube TC2 remains in conducting condition, the signal appearing at output wire TCP2, indicating a memory of the position of the car at the second landing.

As the car arrives at the third landing, as has been previously described, an output signal appears at matrix output terminal M3, corresponding to the position of the car at the third landing. This signal is applied to the grid circuit of memory tube TC3, causing that tube to fire and conduct through its cathode-plate circuit, extending through common plate resistor RL and parallelled resistor-capacitor R3, C3. As current flows through the cathode-plate circuit of tube TC3, a voltage drop appears across cathode resistor R3, charging capacitor C3 to the potential at the cathode electrode c of tube TC3, which potential appears at output wire TCP3, indicating a memory of the car at the third landing. The reduction in circuit impedance to the applied plate voltage, due to both tubes TC2, TC3 conducting, causes an increase in current flow through common plate resistor RL, and a consequent increase in the voltage drop across that resistor. Since the voltage drop across capacitor C2 in the cathode circuit of tube TC2 cannot change instantaneously, the voltage drop appearing across the cathode-plate electrodes of tube TC2 is reduced below the sustaining value of the tube, causing the tube to cease conducting and extinguish. As condenser C2 discharges through resistor R2 to zero value, the potential at the cathode electrode c of tube TC2 and at output wire TCP2 decreases to zero, removing the memory of the position of the car at the second landing. As tube TC2 ceases to conduct, current flow through common plate resistor RL and, in turn, the voltage drop across that resistor return to their previous value. This causes a slight increase in the voltage drop appearing across cathode resistor R3 and the potential at the cathode-electrode c of tube TC3. Cathode condenser C3 charges to this new potential which then appears at output wire TCP3. As the car leaves the third landing, the tube firing signal applied from matrix output terminal M3 to the grid circuit of tube TC3 is removed, as has been previously explained. However, tube TC3 is maintained in conducting condition by its applied plate voltage, thereby remembering the position of the car at the third landing, which position is indicated by the signal appearing at output wire TCP3.

As the car arrives at the fourth landing, a signal appears at matrix output terminal M4, corresponding to the position of the car at the fourth landing. This causes conduction to be transferred from tube TC3 to tube TC4 in a manner similar to that previously described for the travel of the car from the second to the third landing, causing the removal of the signal at output wire TCP3 and the appearance of an output signal at output wire TCP4. The latter signal, indicating a memory of the position of the car at the fourth landing, is maintained, until the car leaves the fourth landing and arrives at the next succeeding landing, as has been described for the memory of the car at the third landing.

Referring to that portion of FIG. 9 which shows the service demand registering circuits, up landing call buttons 1U–5U, down landing call buttons 2D–6D and car call buttons 1C–6C each comprise a gas tube of the 1C21 type and a fixed button TB connected to the tube envelope with the circuits arranged so that the tube conducts in response to the touch of a finger on the button TB and remains conducting, thereby registering the call and enabling the touch to be discontinued. The primary of transformer TR1 may be supplied with alternating current from any suitable source to provide alternating current for the gas tube firing circuits. Signals in terms of voltage, indicating the registration of service demand, are obtained from across the respective cathode resistors of the call button tubes; the registration of down landing calls being obtained from the voltage drops appearing across cathode resistors RDL2–6; up landing calls from across cathode resistors RUL1–5 and car calls from across cathode resistors RCL1–6. The voltage drops, indicating the registration of service demand, are applied, as signals, to the inputs of logic circuitry which controls car movement as will be later described. The structure and operation of the landing and car call registering circuits are more fully dislosed and described in the W. H. Bruns Patent No. 2,525,769.

FIG. 9, as has been previously stated, also shows a portion of the direction control circuits. Such portion includes amplifiers APAA through APAH and APAJ, APAK, and silicon blocking diodes, generally designated V, through which the lefthand side of certain of the cathode resistors RDL2–6, RUL1–5 and RCL1–6 of the service demand registering circuits are connected to the inputs of certain of the amplifiers, for purposes to be explained hereinafter.

Referring to FIG. 13, circuitry is shown for utilizing tachometer generator TG of FIG. 1 to convert the speed of car CA into output signals, corresponding to the car speed. Separately excited field TF (FIG. 13) of tachometer generator TG is connected across supply lines B+, B0. Its armature TA is connected through contacts Z10 of the advancer disabling switch across rectifier bridge circuit RE for full wave rectification of the tachometer generator output voltage. Gas tubes T1E, T2E, T3E of the 5727 type, connected as triodes, have their cathode electrodes c connected directly to supply line B0. Plate voltage is applied to the plate circuits of the tubes over supply line B+. Coils 1E, 2E and 3E of the first, second and third speed switches, respectively, are connected in the respective plate circuits of tubes T1E, T2E and T3E. The tubes are biased to a non-conducting condition over supply line B—, the ohmic values of their respective grid resistors R1, R2 and R3 being such that a first certain negative bias is applied to the grid circuit of tube T1E, a larger certain negative bias is applied to the grid circuit of tube T2E and a still larger certain negative bias is applied to the grid circuit of tube T3E, for purposes to be explained hereinafter. The output of rectifier bridge circuit RE is connected across the grid-cathode circuits of tubes T1E, T2E and T3E. Grid capacitors CG1–3 act as noise filters.

To illustrate the operation of the circuits of FIG. 13, assume that the car starts from a landing and accelerates to full speed. As the speed of the car increases from zero, armature TA coupled to drive shaft 4 (FIG. 1) of hoisting motor M rotates at an increasing speed, generating an output voltage which is rectified by rectifier RE (FIG. 13) and applied to the grid-cathode circuits of tubes T1E, T2E and T3E. When the speed of the car and, in turn, the rectified generator voltage, attain a first certain value, respectively, the rectified voltage applied to the grid circuits of the tubes is sufficient in magnitude to overcome the negative bias applied to the grid circuit of tube T1E, causing it to fire and conduct through its cathode-plate circuit, extending from supply line B0 through coil 1E of the first speed switch, contacts 2E1 of the second speed switch, contacts 3E1 of the third speed switch and contacts 3DEC2 of the third decelerating switch to supply line B+. The flow of plate current through coil 1E of the first speed switch causes the switch to operate and engage its contacts 1E1, connecting output wire V1E to supply line B+. The potential of supply line B+ appears, as a signal, at output wire V1E, indicating that the car is traveling at a first certain speed.

As the speed of the car, and, in turn, the voltage generated by tachometer generator TG increase to a second certain value, the rectified voltage applied to the grid-cathode circuit of tube T2E attains a magnitude to counteract the negative bias applied to its grid circuit sufficiently to cause tube T2E to fire and conduct through its cathode-plate circuit, extending through coil 2E of the second speed switch. Switch 2E operates and engages its contacts 2E2, causing the potential of supply line B+ to appear at output wire V2E, thereby indicating that the car has attained a second certain speed. Switch 2E also separates its contacts 2E1 in the plate circuit of tube T1E, interrupting the flow of current through coil 1E of the first speed switch and causing tube T1E to cease conducting and extinguish. Switch 1E returns to unoperated condition, separating its contacts 1E1 and engaging its contacts 1E2, thereby removing the potential of supply line B+ from output wire V1E.

As the car attains full speed, the rectified output voltage of tachometer generator TG increases to a third certain value, which is sufficient in magnitude to counteract the negative bias applied to tube T3E, causing the tube to fire and conduct through its cathode-plate circuit, extending through coil 3E of the third speed switch. Switch 3E operates and engages its contacts 3E2, causing the potential of supply line B+ to appear at output wire V3E, thereby indicating that the car is traveling at full speed. Switch 3E also separates its contact 3E1 in the plate circuits of tubes T1E and T2E, interrupting the flow of current through coil 2E of the second speed switch and causing tube T2E to cease conducting and extinguish. Second speed switch 2E returns to unoperated condition, separating its contacts 2E2 and engaging its contacts 2E3, thereby removing the potential of supply line B+ from output wire V2E.

Incident to the initiation of slowdown of the car for a stop, contacts 3DEC2 of the third deceleration switch separate, interrupting the plate circuits of tubes T1E, T2E and T3E and the flow of current through coil 3E of the third speed switch. Tube T3E ceases to conduct and extinguishes. Switch 3E returns to unoperated condition, separating its contacts 3E2 and engaging its contacts 3E3, thereby removing the potential of supply line B+ from output wire V3E. Contacts 3DEC2 of the third deceleration switch remain separated until the car comes to a full stop.

In this manner, signals in terms of voltage appear at output wires V1E, V2E and V3E, which signals correspond to and are indicative of the car's speed. It may be noted that, under conditions where the associated speed switches are operated, the potential of supply line B+ appears at the output wires for use as input blocking signals to control circuitry, and, under conditions where they are in an unoperated condition, a low impedance path from the output wires to supply line B0 is available for connection to control circuitry, for purposes to be described hereinafter.

Figure 10:
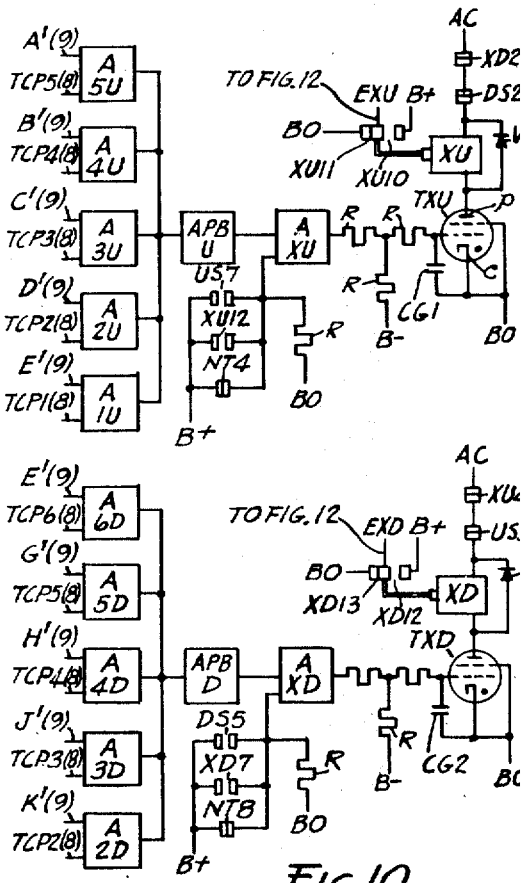
FIG. 10 is a schematic wiring diagram of the remainder of the direction control circuits.

The circuits for controlling the movement of the car in response to service demand will now be described. Referring to FIG. 10, gas tubes TXU and TXD of the 5727 type, connected as triodes, have their respective cathode electrodes c connected directly to supply line B0. An alternating plate voltage is applied over supply line AC to the plate circuits of the tubes; coil XU of the up direction memory switch and coil XD of the down direction memory switch being connected in the plate circuits of tubes TXU, TXD, respectively. A polarizing diode V is connected across each of the switch coils XU, XD. The grid circuit of tube TXU is connected to the output of And circuit AXU, shown as a block symbol, representative of the circuitry of FIG. 5, and having two input conditions. One of these input conditions is supplied by the output of amplifier APBU, shown as a block symbol, representative of the circuitry of FIG. 7. Five And circuits, designated A1U to A5U and each having two input conditions, have their respective outputs connected in common to the input of amplifier APBU. The grid circuit of tube TXD of the down direction memory circuit is similarly connected to And circuit AXD, amplifier APBD and the five And circuits, designated A2D to A6D. Tubes TXU, TXD, in the absence of output signals from their respective And circuits AXU, AXD, are biased to non-conducting condition over supply line B—. Grid capacitors CG1–2 of the tubes act as noise filters.

Figure 11:
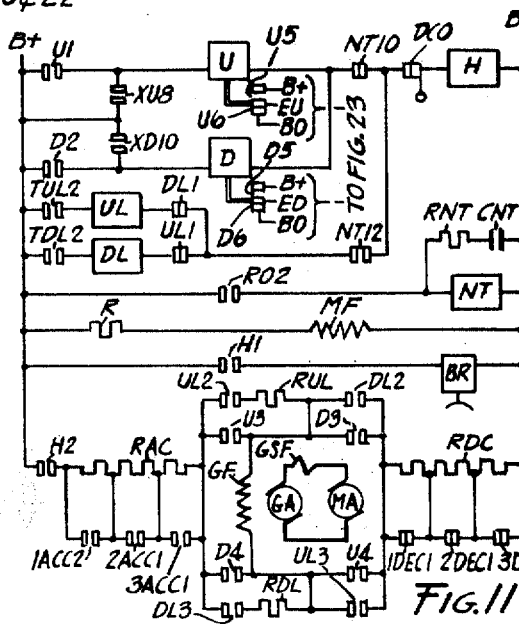
FIG. 11 is a simplified schematic wiring diagram of hoisting motor and hoisting motor control circuits.

Referring to FIG. 11, any suitable form of power supply may be provided for the elevator hoisting motor. One of the preferred arrangements is to employ a direct current elevator motor and to cause current to be supplied to the motor at a variable voltage, as from a driven generator in accordance with Ward Leonard principles. The generator of such arrangement has been illustrated. The driving motor for the motor-generator set and control arrangement therefor have not been illustrated. The armature of the generator is designated GA, its separately excited field winding being designated GF and its series field winding GSF. The armature of the elevator motor is designated MA and its separately excited field winding MF. Resistors RAC, RDC, RUL and RDL are provided for controlling the strength of the generator separately excited field GF ıd, therefore, the voltage applied to elevator motor armare MA. BR designates the release coil of the electroagnetic brake B (FIG. 1).

For the sake of brevity. the car and hoistway doors and eir power and control circuits have not been shown, it ;ing understood that they are of the conventional autoatic type. There are two pairs of contacts operated by e car door, each engaged when the car door is closed. ıe door interlock contacts operated by the various hoistıy doors are arranged in series relation. These contacts e not closed until the hoistway doors are closed and cked. For convenience, these car and hoistway door concts are shown as a single pair of contacts, designated C0 (FIG. 11), of a mechanical switch actuated by door ovement, the contacts being shown for the closed posiın of the door.

Figure 12:
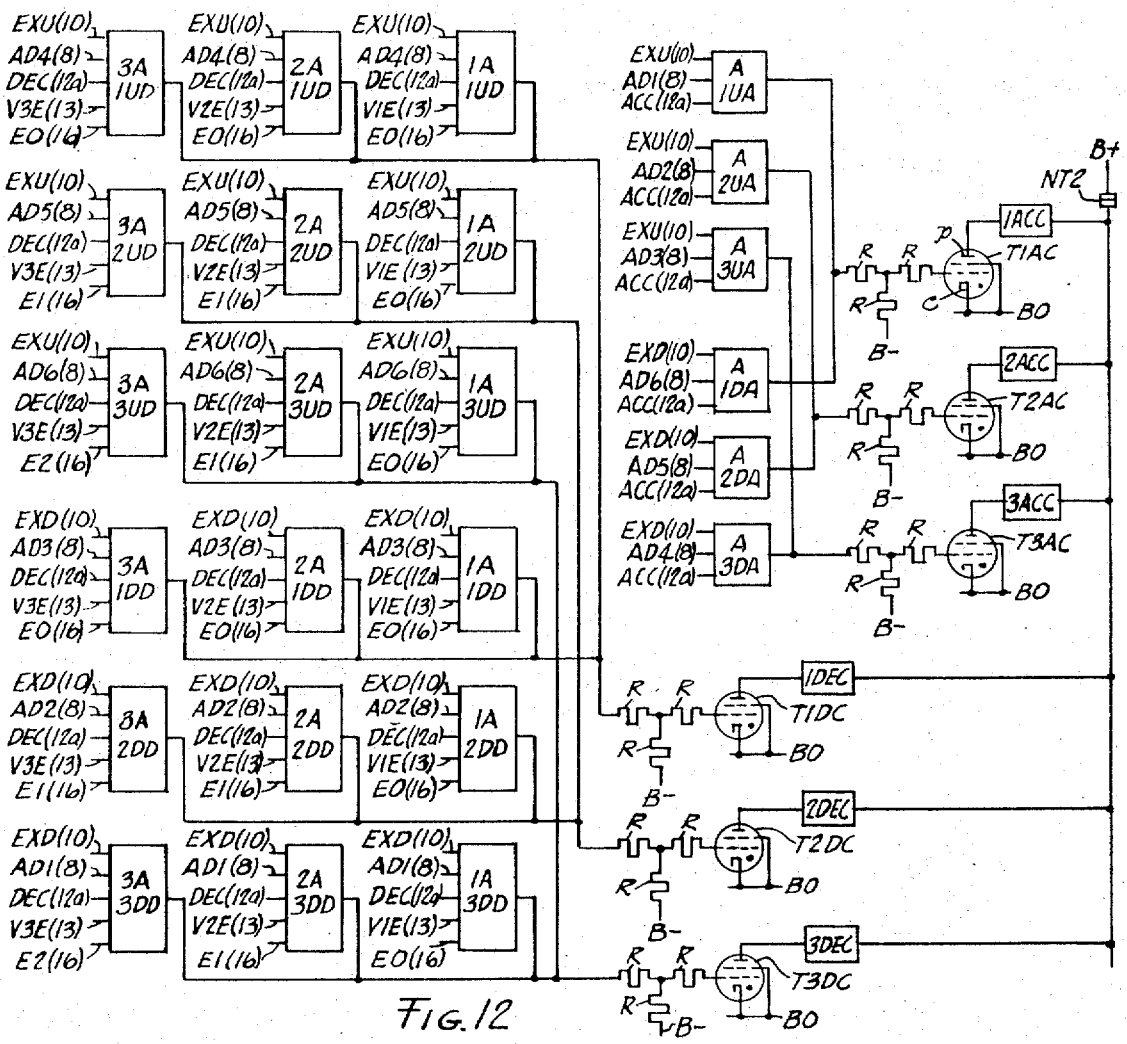
FIG. 12 is a schematic wiring diagram of acceleration and deceleration control circuits.

Referring to FIG. 12 wherein circuits for the control of :celeration and deceleration of the car are shown, gas bes T1AC, T2AC and T3AC, associated with accelerain control and tubes T1DC, T2DC and T3DC, associed with deceleration control, are of the 5727 type con:cted as triodes and have their cathode electrodes c con:cted directly to supply line B0. Plate voltage is applied the plate circuits of the tubes over supply line B+. ɔils 1ACC, 2ACC and 3ACC of the first, second and ird accelerating switches are connected in the respective ate circuits of tubes T1AC, T2AC and T3AC, and coils )EC, 2DEC and 3DEC of the first, second and third de:lerating switches are connected in the respective plate rcuits of tubes T1DC, T2DC and T3DC. The grid circiit of each acceleration control tube T1AC, T2AC and 3AC is connected to the common output of two And ciriits, each of which And circuits has three input condiɔns; the grid circuit of tube T1AC being connected to the ɔmmon output of And circuit A1UA, for up travel of e car, and A1DA, for down travel; the grid circuit of .be T2AC being connected to the common output of And rcuits A2UA, A2DA; and the grid circuit of tube T3AC And circuits A3UA and A3DA. The grid circuit of ıch deceleration control tube T1DC, T2DC and T3DC connected to the common output of six And circuits, .ch of which And circuits has five input conditions; the id circuit of tube T1DC being connected to the common ıtput of And circuits 1A1UD to 3A1UD, for the up diction of car travel and 1A1DD to 3A1DD, for the ɔwn direction; the grid circuit of tube T2DC being con:cted to the common output of And circuits 1A2UD to A2UD and 1A2DD to 3A2DD, and the grid circuit of be T3DC being connected to And circuits 1A3UD to A3UD and 1A3DD to 3A3DD. Acceleration control bes T1AC, T2AC and T3AC and deceleration control bes T1DC, T2DC and T3DC, in the absence of output gnals from the And circuits connected to their respective id circuits, are biased to non-conducting condition over ıpply line B—.

Figure 12A:
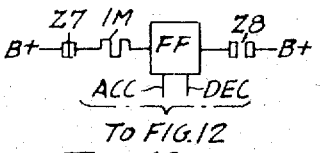
FIG. 12a is a schematic wiring diagram of an acceleration-deceleration memory circuit used in conjunction with the circuits of FIG. 12.

FIG. 12a illustrates circuitry for remembering whether e car is accelerating or decelerating. A flip-flop circuit F1, shown as a block symbol, representative of the cirıits of FIG. 6, produces either of two output signals, over ıtput wires ACC, DEC, in response to "set" and "reset" gnals applied over supply lines B+ through contacts Z7, 8 of the advancer disabling switch.

Figure 14:
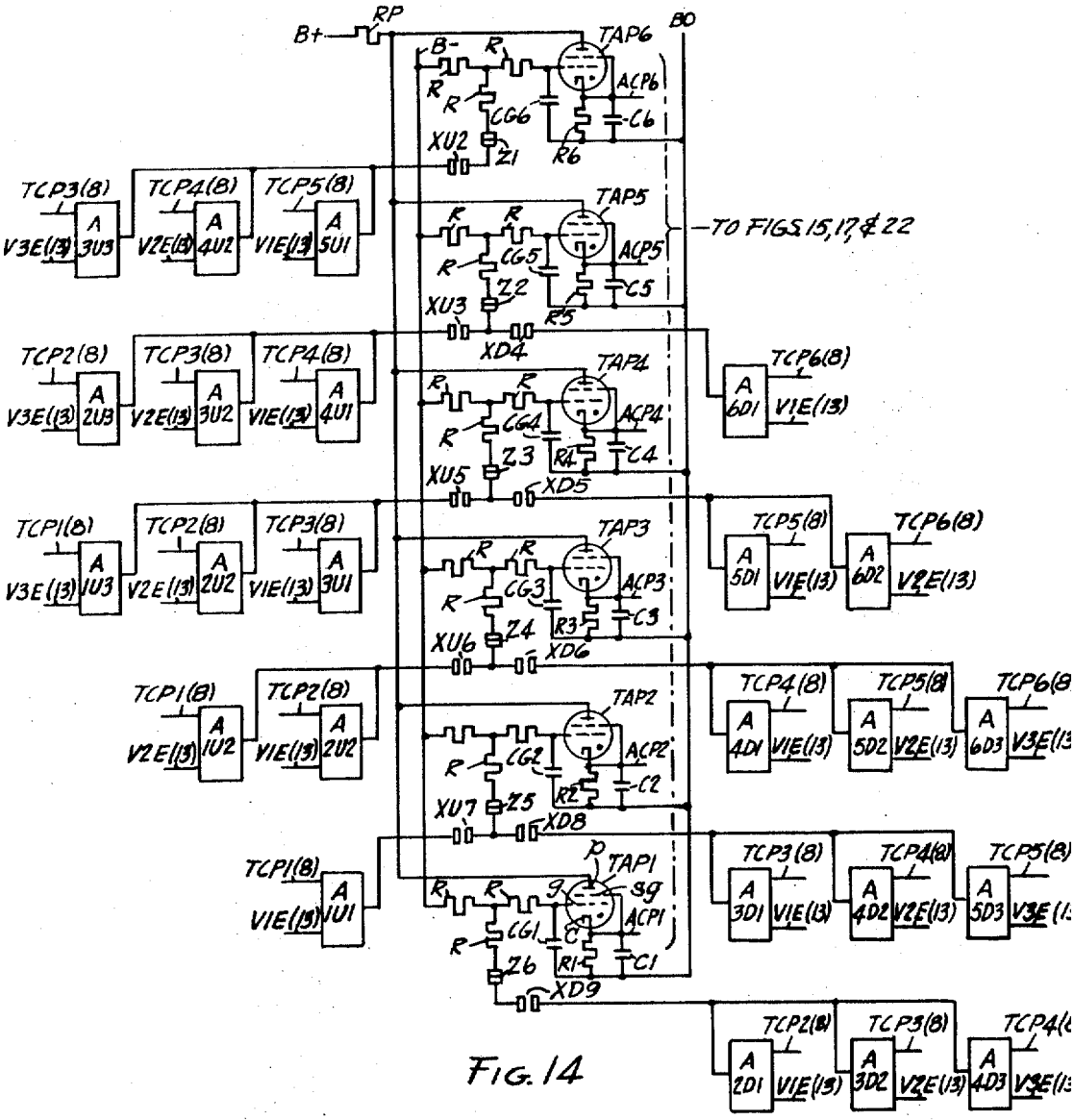
FIG. 14 is a schematic wiring diagram of car position advancer and advanced car position memory circuits.

Referring to FIG. 14 wherein circuits are shown for lvancing the position of the car fictitiously one or more ndings, depending upon the speed of the car, and for reembering such advanced position, gas tubes TAP1–TAP6 the 5727 type, connected as triodes, have their respecve plate electrodes p connected through common plate sistor RP to supply line B+. The cathode circuit of each ıbe (TAP1–6) consists of a parallel resistor-capacitor R, C) circuit, connecting its associated cathode elecode c to supply line B0. Grid condensers CG1–6 are ovided for noise filtration. The grid circuit of each tube connected to the output of one or more And circuits, ıch of which And circuits has two input conditions, for applying firing signals to the tubes to initiate their conduction; the grid circuit of tube TAP1 being connected to the common output of And circuits A2D1, A3D2 and A4D3, for down travel of the car; the grid circuit of tube TAP2 being connected to the common output of A3D1, A4D2, A5D3, for down car travel, and to A1U1 for up travel; tube TAP3 to A4D1, A5D2 and A6D3 for down travel and to A2U1 and A1U2 for up travel; tube TAP4 to A5D1 and A6D2 for down travel and to A3U1, A2U2 and A1U3 for up travel; tube TAP5 to A6D1 for down travel and to A4U1, A3U2 and A2U3 for up travel, and tube TAP6 to A5U1, A4U2 and A3U3 for up travel. Output signals, indicating the fictitiously advanced car position, are obtained over output wires ACP1–6 connected directly to the cathode electrodes c of tubes TAP1–6, respectively. In the absence of firing signals to the respective grid circuits of tubes TAP1–6, the tubes are maintained in nonconducting condition by the negative grid bias supplied over supply line B—.

Figure 15:
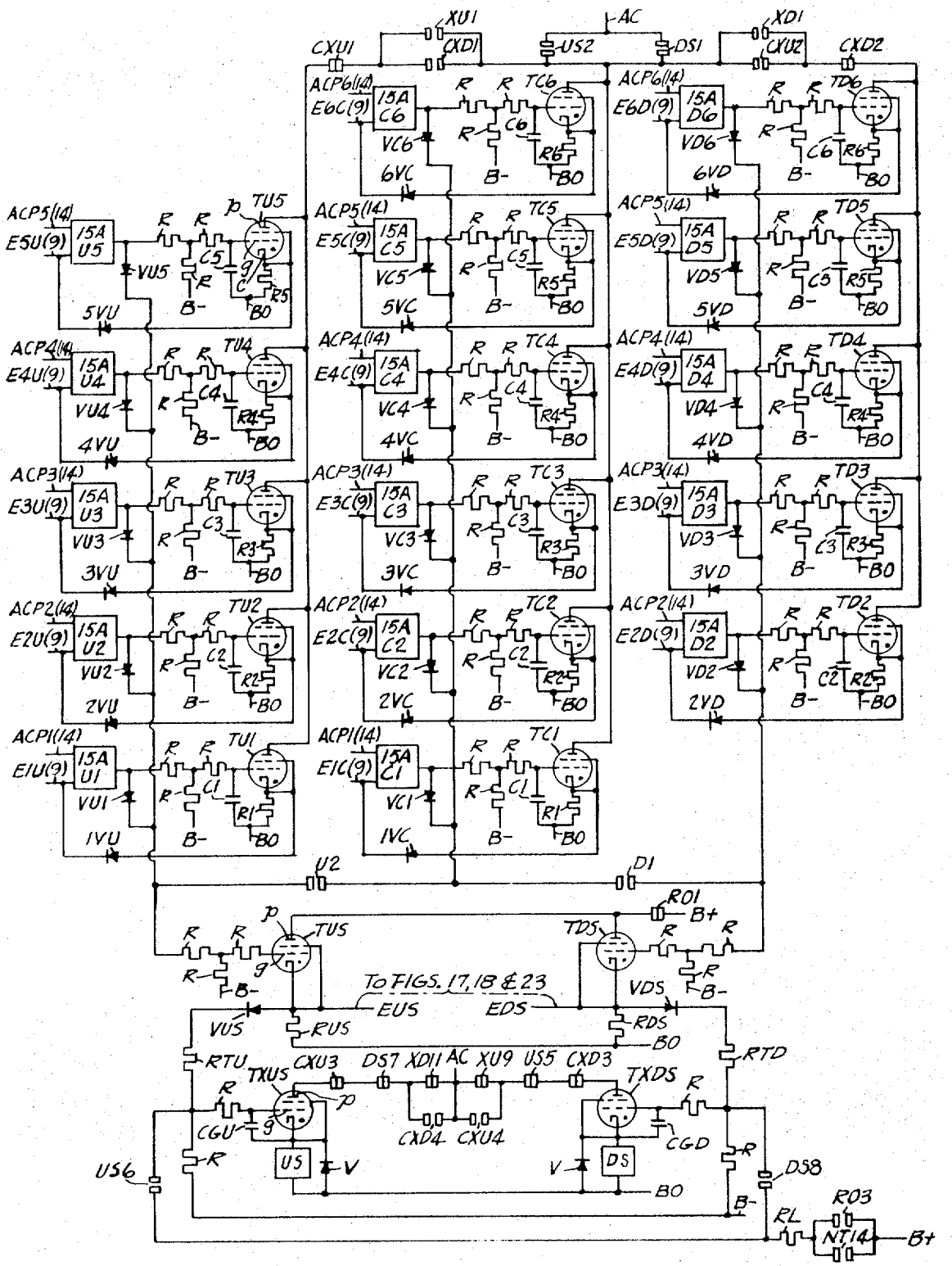
FIG. 15 is a schematic wiring diagram of coincident circuits for car and hall call advance pickup and cancellation, and stop initiation circuits.

In FIG. 15 circuits for stop initiation and call cancellation are shown. Tubes TU1–5, associated with up landing calls, tubes TD2–6, associated with down landing calls, and tubes TC1–6, associated with car calls, are gas tubes of the 5727 type connected as triodes and have their respective cathode electrodes c connected through cathode resistors (R1–6) to supply line B0. Alternating plate voltage is applied to these tubes over supply line AC. In the absence of input signals to their respective grid circuits, they are biased to nonconducting condition by means of the negative grid bias applied to their respective grid circuits over supply line B—. Grid capacitors C1–6 of the tubes act as noise filters. The grid circuit of each tube is connected to an associated And circuit, having two input conditions, for applying firing signals to the tubes to initiate their conduction; the outputs of And circuits 15AU1 to 15AU5 being connected to the respective grid circuits of up landing call tubes TU1–5; the outputs of 15AD2 to 15AD6 being connected to tubes TD2 to TD6, respectively, and 15AC1 to 15AC6 being connected to tubes TC1–6, respectively. Output signals obtained across the respective cathode resistors (R1–6) of the tubes may be "fed back" through blocking diodes (1VU–5VU, 1VC–6VC and 2VD–6VD) to the call registering circuits of FIG. 9 for cancelling registered calls, as will be hereinafter described.

The respective outputs of And circuits 15AU1 to 15AU5 (FIG. 15), associated with up landing calls, are also connected to the grid circuit of up stop memory tube TUS, while the respective outputs of And circuits 15AD2 to 15AD6, associated with down landing calls, are also connected to the grid circuit of down stop memory tube TDS. The respective outputs of And circuits 15AC1 to 15AC6, associated with car calls, are also connected to the grid circuits of memory tubes TUS, TDS through blocking diodes (VC1–6) and directional contacts U2, D1 of the up and down switches U, D, respectively.

Memory tubes TUS, TDS are gas tubes of the 5727 type having their respective plate electrodes p connected to supply line B+, and their respective cathode electrodes c connected through cathode resistors RUS, RDS, respectively, to supply line B0. Output signals, indicating the memory and direction of the stop initiated, may be obtained from across the respective cathode resistors RUS, RDS over wires EUS, EDS, respectively. These output signals may also be applied through resistor RTU to the grid circuit of up stop initiating tube TXUS, and through resistor RTD to the grid circuit of down stop initiating tube TXDS.

Stop initiating tubes TXUS, TXDS are gas tubes of the 5727 type connected as triodes and have their respective plate electrodes p supplied with alternating plate voltage over supply line AC. The respective cathode electrodes c of tubes TXUS, TXDS are connected through coils US, DS, respectively, of the up stopping switch and the down stopping switch, respectively, to supply line B0. A polarizing diode V is connected across each coil US, DS. Grid capacitors CGU, CGD act as noise filters. In the absence of input signals to the respective grid circuits of tubes TXUS, TXDS, the tubes are biased to nonconducting condition by means of the negative bias applied to their respective grid circuits over supply line B—. Firing signals may also be applied to the grid circuits of stop initiating tubes TXUS, TXDS over supply line B+ through either contacts R03 of the stop initiating switch or contacts NT14 of the stop time switch (when either pair of contacts is engaged) and thence through line resistor RL and up stopping switch contacts US6 to the grid circuit of tube TXUS and down stopping switch contacts DS8 to the grid circuit of tube TXDS.

Figure 16:
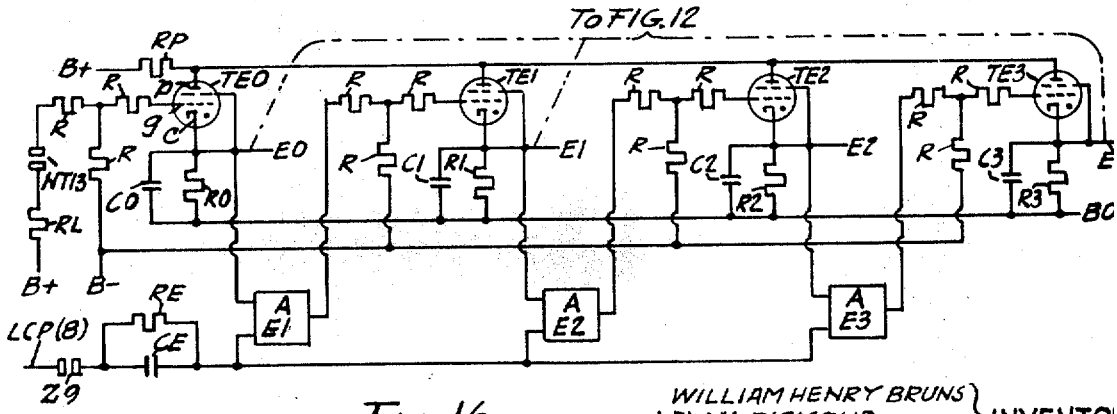
FIG. 16 is a schematic wiring diagram of a counting circuit.

Referring to FIG. 16 wherein circuitry for a counter is shown, tubes TE0 and TE3 are gas tubes of the 5727 type connected as triodes and have their respective plate electrodes p connected through common plate resistor RP to supply line B+. The cathode circuit of each tube (TE0–3) consists of a parallel resistor-capacitor (R0–3, C0–3) circuit, connecting its associated cathode electrode c to supply line B0. In the absence of input signals to their respective grid circuits, the tubes are biased to nonconducting condition over supply line B—. The cathode electrodes c of tubes TE0–2 are connected directly to the inputs of And circuits AE1 to AE3, respectively, which And circuits each have two input conditions. The second input condition of each And circuit may be supplied over wire LCP through contacts Z9 (when engaged) of the advancer disabling switch and capacitor CE; resistor RE being of relatively high ohmic value to provide a discharge leakage path for capacitor CE.

The respective outputs of And circuits AE1 to AE3 are connected to the grid circuits of tubes TE1 to TE3, respectively, as will be described hereinafter. Output signals, indicating a count of from 0 to 3 may be obtained from across the respective cathode resistors (R0–3) of tubes TE0–3 (when in conducting condition) over output wires E0 to E3, and an input "reset" signal for resetting the counter to zero (by causing conduction to be transferred to tube TE0) may be applied to the grid circuit of tube TE0 over supply line B+ through resistor RL by the engagement of contacts NT13 of the stop time switch incident to the arrival of the car at a landing stop.

Figure 17:
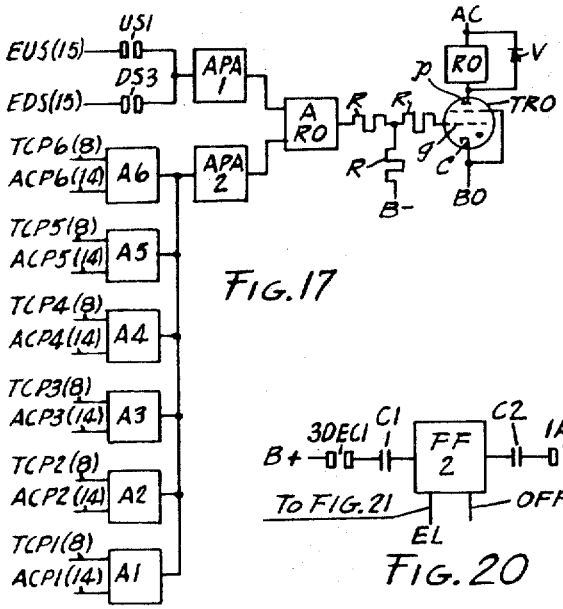
FIG. 17 is a schematic wiring diagram of stop control circuits.

Referring to FIG. 17 wherein stop circuits are shown, gas tube TR0 is of the 5727 type connected as a triode and has its cathode electrode c connected directly to supply line B0. The plate electrode p of tube TR0 is connected through coil R0 of the stop switch to supply line AC, a polarizing silicon diode V being connected across the coil. The grid circuit of the tube is connected to the output of And circuit AR0, which And circuit has two input conditions. One of the input conditions is supplied from the amplifier APA1, and the other from amplifier APA2. The input to amplifier APA2 is connected to the common output of And circuits A1 to A6, each having two input conditions. In the absence of an output signal from And circuit AR0 to the grid circuit of tube TR0, the tube is biased to nonconducting condition over supply line B—.

Figure 18:
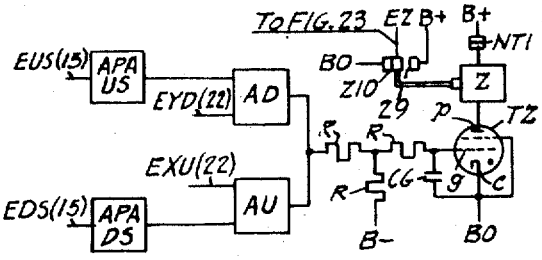
FIG. 18 is a schematic wiring diagram of a portion of the advancer disabling circuits.

FIG. 18 shows a portion of the circuitry for disabling the advancer. Gas tube TZ is of the 5727 type connected as a triode and has its cathode electrode c connected directly to supply line B0. Its plate electrode p is connected through coil Z of the advancer disabling switch and contacts NT1 to supply line B+. Grid condenser CG, connecting the grid electrode g to the cathode electrode c, is provided for purposes of noise filtration. The grid circuit of tube TZ is connected to the common output of And circuits AD, AU, each having two input conditions. The output of amplifier APAUS is connected to the input of And circuit AD, supplying one of the input conditions of that And circuit, while the output of amplifier APADS is connected to the input and supplies one of the input conditions of And circuit AU. In the absence of an output signal from And circuits AD, AU, tube TZ is biased to nonconducting condition over supply line B—.

Figure 20:
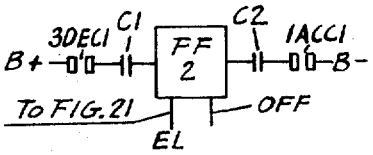
FIGS. 19, 20 and 21 are schematic wiring diagrams of leveling control circuits.
Figure 21:
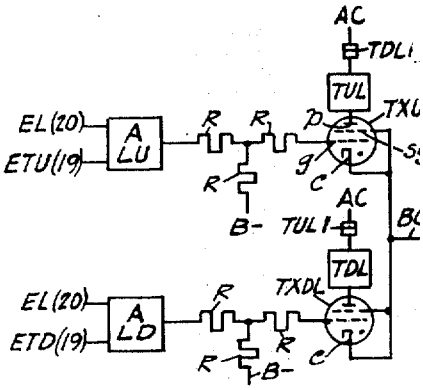
Figure 19:
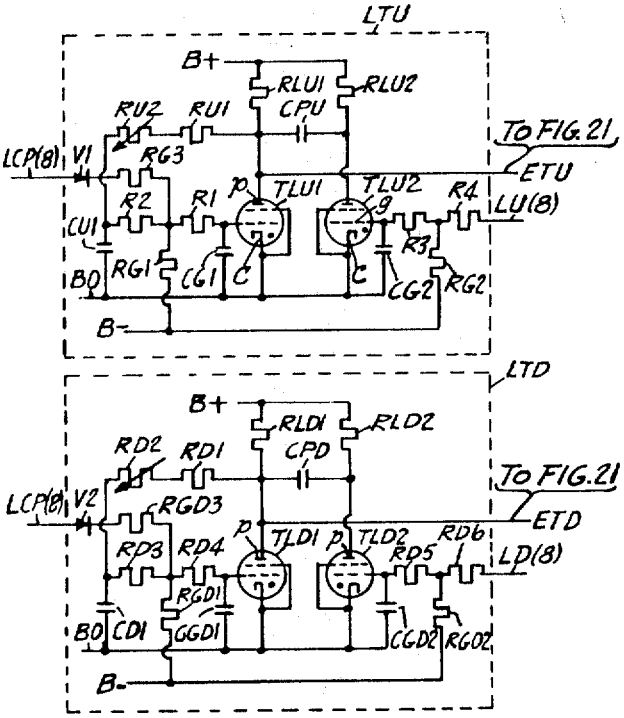

FIGS. 19, 20 and 21 illustrate leveling control circuitry. In FIG. 19 are shown the circuitry for two leveling timers, one for leveling up to a landing and one for leveling down to a landing, they being shown in broken line outline and designated LTU and LTD, respectively. Since the circuits for both timers are similar, only the circuit of timer LTU will be described. Gas tubes TLU1, TLU2 are of the 5727 type connected as triodes and have their respective cathode electrodes c connected directly to supply line B0. Grid condensers CG1–2 are provided for purposes of noise filtration. The plate electrodes p of tubes TLU1, TLU2 are connected through plate resistors RLU1, RLU2, respectively to supply line B+ and to each other by capacitor CPU. The grid circuit of tube TLU2 is connected to input wire LU(8). The plate electrode p of tube TLU1 is connected through fixed resistor RU1 and variable resistor RU2 to the tube grid circuit which, in turn, is connected through capacitor CU1 to supply line B0 Input wire LCP(8) is connected through blocking diode V and resistor RG3 to the common junction point of grid resistors R2, R1 and RG1. Fixed resistors RLU1, RU1, variable resistor RU2 and capacitor CU1 comprise a resistor-capacitor timing circuit which, as will be hereinafter described, in conjunction with "flip-flop" operation of tubes TLU1, TLU2, provides a time output over output wire ETU, connected directly to the plate electrode p of tube TLU1.

FIG. 20 illustrates a "flip-flop" circuit shown in block symbol and designated FF2, which circuit receives from supply line B+ its "set" pulse signal through contacts 2DEC1 of the third decelerating switch and condenser C1, and its "reset" pulse signal through contacts 1ACC1 of the first accelerating switch and condenser C2 to provide, in response to the "set" signal, an output signal over output wire EL, for purposes to be explained hereinafter.

FIG. 21 shows two gas tubes TXUL, TXDL of the 5727 type connected as triodes and having their respective cathode electrodes c connected directly to supply line B0. The plate electrode p of tube TXUL is connected through coil TUL of the auxiliary up leveling switch and interlocking contacts TDL1 of the auxiliary down leveling switch to supply line AC, while tube TXDL is similarly connected to supply line AC through coil TDL of the auxiliary down leveling switch and interlocking contacts TUL1 of the auxiliary up leveling switch. The output of And circuit ALU is connected to the grid circuit of tube TXUL, while the output of And circuit ALD is connected to the grid circuit of tube TXDL, each And circuit having two input conditions. In the absence of output signals from their respective And circuits, tubes TXUL and TXDL are biased to nonconducting condition over supply line B—.

Figure 22:
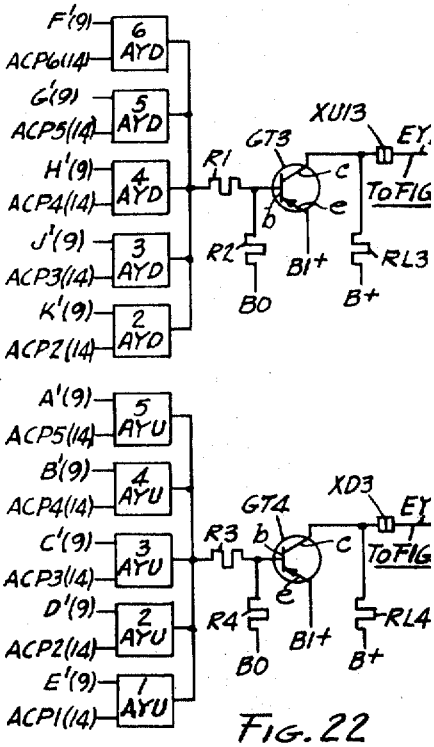
FIG. 22 is a schematic wiring diagram of the remainder of the advancer disabling circuits.

FIG. 22 shows circuitry for disabling the advancer incident to stopping of the car at a landing stop. Two similar circuits, one for the up direction of car travel and one for the down direction of car travel are shown, each utilizing a transistor of the General Electric 2N167 type, designated GT3 for the down direction and GT4 for the up direction circuits. Since both transistors are similarly connected, only the circuits for transistor GT3 will be described. The collector electrode c of transistor GT3 is connected through contacts XU13 to output wire EYD and through resistor RL3 to supply line B+. Its emitter electrode e is connected directly to supply line B1+ which is at substantially zero voltage. Its base electrode b is connected through resistor R2 to supply line B0 and through resistor R1 to the common output of And circuits 2AYD to 6AYD, each having two input conditions. In the absence of an output signal from And circuits 2AYD to 6AYD, the base electrode b of transistor GT3 is biased sufficiently negative with respect to its emitter electrode e to maintain the transistor in nonconducting condition. Under such conditions, the potential of supply line + appears at output wire EYD, as an output signal, for ırposes to be described hereinafter. Similarly, transistor T4, in the absence of an output signal from its associed And circuits 1AYU to 5AYU is biased to noncon-ıcting condition, causing the potential of supply line + to appear at output wire EYU.

Figure 23:
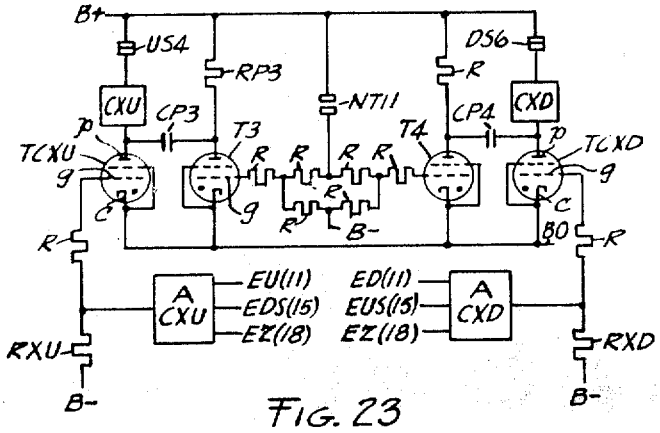
FIG. 23 is a schematic wiring diagram of circuits which insure the reversal of the car at its furthest call notwithstanding the subsequent registration of a still further call.

FIG. 23 shows circuitry for assuring the reversal of the .r at its furthest call notwithstanding the subsequent gistration of a still further call, and includes two similar lip-flop" circuits, one utilizing gas tubes TCXU, T3 for e up direction of car travel, and the other gas tubes XCD, T4 for the down travel of the car. For simplicity, ıly the "flip-flop" circuit for the up travel will be deribed. Tubes TCXU, T3 are of the 5727 type connected triodes and have their respective cathode electrodes c ›nnected directly to supply line B0. The plate electrodes of the tubes are connected to each other through plate ›ndenser CP3. The plate electrode p of tube T3 is also ›nnected through plate resistor RP3 to supply line B+, hile the plate electrode p of tube TCXU is connected rough coil CXU of the up call reversal switch and ›ntacts US4 of the up stopping switch to supply line B+. he grid circuit of tube T3 is resistively connected to ıpply line B— and may be connected through contacts T11 of the stop time switch to supply line B+. With ›ntacts NT11 separated, tube T3 is biased to noncon-ıcting condition over supply line B—. The grid circuit of be TCXU is connected to the output of And circuit CXU, having three input conditions, and through resis-r RXU to supply line B—. In the absence of an output om And circuit CXU, tube TCXU is biased to noncon-ıcting condition over supply line B—. In the flip-flop cir-ıit associated with down car travel, coil CXD of the ›wn car reversal switch and And circuit ACXD are simi-rly connected in the circuits of tubes TCXD, T4.

In describing the operation of the car control circuits it ill be assumed that the car on its last trip arrived at the ›cond landing 2L (FIG. 1), opened the car and hoistway ›ors (not shown), discharged its passengers and, at the ›piration of a predetermined stopping time, in the ab-ıce of further service demand, remained parked at such nding with the doors open. Under such conditions, stop me switch NT (FIG. 11) is in released condition, in-cating that the predetermined stopping time has expired ıd contacts DC0 of the interlock switch for the car and ›istway doors is in open position, disabling the car start-g circuits, the door interlock switch DC0 having been ›tuated to open condition by door movement incident to ıe opening of the car and hoistway doors. It is to be un-›rstood that the door control circuits (not shown) initi-e the closing of the car and hoistway doors at the ex-ration of the predetermined stopping time, provided that demand for service is in registration.

It is also to be understood that incident to the decelera-on of the car at a landing, as will be described herein-ter, contacts 3DEC1 (FIG. 20) of the third decelerating vitch engage, applying a "set" pulse to flip-flop FF2, ıereby causing it to produce a blocking signal at its ıtput wire EL for leveling control purposes. Thus, for ıe position of the car at the second landing, a blocking gnal appears at output wire EL.

It is further to be understood that incident to the ar-val of the car at a landing, as will hereinafter be de-ribed, contacts NT13 (FIG. 16) of the stop time switch ıgage, resetting the counter to zero by causing conduc-on to be transferred to tube TE0, which conduction, ıce initiated, is maintained after the release of switch T. Thus, for the position of the car at the second land-g, a signal, indicating a zero count, appears at output ire E0, for purposes to be explained hereinafter.

With the car at the second landing, the code of tape ›w TCP2 (FIG. 2), corresponding to the position of the ır, as has been previously described, is translated by the rcuits of FIG. 8 into an output signal appearing at ma-ix output terminal M2, which signal, in turn, produces an output signal at output wire TCP2 of the true car position memory circuit MTCP. The signal at matrix output terminal M2 is also applied, through blocking diode VC2 and amplifier APA7, over output wire LCP to leveling timers LTU, LTD (FIG. 19) to reset such timers by insuring that their respective tubes TLU1, TLD1 are in conducting condition, as will be described hereinafter.

The signal appearing at output wire TCP2 (FIG. 8), indicating that the car is at the second landing, is applied as a blocking voltage to And circuit A2U (FIG. 10) of the up direction circuits and to And circuit A1D of the down direction circuits, thereby preparing the direction circuits.

In order to describe how, in response to a demand for service the car is started, assume that an up hall call is registered by an intending passanger at the fifth landing 5L. Under such conditions, touch button tube 5U (FIG. 9) is in conducting condition, the voltage drop appearing across its cathode resistor RUL5, indicating the registration of the call. The potential at the left side of cathode resistor RUL5 (FIG. 9) is applied through blocking diode V5U1 to the input of amplifier APAF, and through blocking diode V5U2 to junction point B. From junction point B the signal is applied directly to the input of amplifier APAB and through blocking diode VBC to the input of amplifier APAC at junction point C. From junction point C it is applied through blocking diode VCD to the input of amplifier APAD at junction point D, and from junction point D through rectifier VDE to the input of amplifier APAE. The signal from the outputs of the aforementioned amplifiers, thus multiplexed and amplified, is applied over wires F′, B′, C′, D′ and E′, as a blocking signal, to certain of the And circuits of FIG. 10; i.e., A6D, A4U, A3U, A2U and A1U. The potential, appearing at the left-hand side of cathode resistor RUL5 of touch button tube 5U (FIG. 9), is also applied over wire E5U, as a blocking voltage, to And circuit 15AU5 (FIG. 15), for purposes to be explained hereinafter. Incident to the registration of the up hall call, door control circuits (not shown) initiate closing of the car and hoistway doors.

The blocking signal applied to And circuit A2U (FIG. 10) over output wire D′ in conjunction with the previously described blocking signal applied over wire TCP2 (for the position of the car at the second landing), satisfies both input conditions of And circuit A2U, causing an output signal from such And circuit to be applied to the input of amplifier APBU. Amplifier APBU applies the amplified signal, as a blocking voltage, to And circuit AXU, the second input condition of which And circuit is supplied by the blocking voltage applied from supply line B+ through contacts NT4 of the stop time switch. With all input conditions of And circuit AXU simultaneously satisfied, it applies a firing signal to the grid circuit of up direction tube TXU, which signal is of sufficient positive polarity to overcome the negative bias applied to the tube, causing the tube to fire and conduct through its cathode-plate circuit on positive half cycles of the applied plate voltage. The flow of plate current through coil XU of the up direction memory switch causes the switch to operate, establishing the direction of car travel as up. The "drop-out" time of switch XU, in conjunction with its polarizing diode V, is effective to maintain the switch in operated condition during negative half cycles of the alternating plate voltage.

Switch XU engages its contacts XU8 (FIG. 11), preparing a circuit for coil U of the up switch and coil H of the brake switch. As the car and hoistway doors (not shown) reach their fully closed position, door interlock contacts DC0 are actuated by door movement to closed position, completing the circuit for coils U and H, the circuit extending from supply line B+ through contacts XU8, coil U, contacts NT10, DC0 and coil H to supply line B0.

Switch XU also separates its contacts XU4 (FIG. 10), in the plate circuit of down direction tube TXD, disabling the down direction circuits, thereby preventing the subsequent registration of a service call for a landing below the position of the car from changing the direction of car travel to down, until the fifth landing call is answered. In addition, switch XU engages its contacts XU10, applying a blocking voltage from supply line B+ over wire EXU to the FIG. 12 And circuits associated with acceleration and deceleration during up travel of the car, but without effect at this time. Switch XU further engages its contacts XU2, 3, 5, 6 and 7 (FIG. 14) in the grid circuits of advance car position memory tubes TAP6–2, respectively, thereby preparing their respective grid circuits for firing signals from their interconnected And circuits associated with up car travel, for purposes to be explained hereinafter. Switch XU also engages its contacts XU1 (FIG. 15) in the plate circuit of up landing call cancelling tubes TU1–5, without effect at this time, and separates its contacts XU9, preventing the stop initiating circuits from responding to down calls for landings below the fifth landing. In addition, switch XU separates its contacts XU13 (FIG. 22), supplying over wire EYD one input condition of And circuit AD, thereby preparing the advancer disabling circuits for operation in response to up stops, as will be described hereinafter.

Switch U (FIG. 11), upon operation, engages its self-holding contacts U1 and its contacts U3, U4, preparing a circuit for separately excited generator field winding GF. Switch H, upon operation, engages its contacts H1, completing a circuit for release coil BR of the brake, thereby releasing the brake, and engages its contacts H2, completing a circuit for generator field winding GF for up direction of car travel, the circuit extending from supply line B+ through contacts H2, accelerating resistor RAC, contacts U3, generator field winding GF, contacts U4 and decelerating resistor RDC to supply line B0. The car starts moving in the up direction.

Switch U also engages its contacts U5, applying the potential of supply line B+, as a blocking voltage, over wire EU to And circuit ACXU (FIG. 23), without effect at this time. Switch U further engages its contacts U2 (FIG. 15), also without effect at this time.

As the car moves upward from the second landing toward the fifth landing, tape 7 (FIG. 2) follows car movement, causing coded rows AD1, AD2 and AD3 to move sequentially into alignment with light cells LC1–5. As has been previously described, the code of the rows is translated in sequence into signal outputs at matrix output terminals M9, 10 and 11 (FIG. 8), which terminals correspond to the aforementioned predetermined accelerating distances from the second landing. Since the car moves past such corresponding acceleration points without stopping, the signal outputs produced at the terminals are in the form of pulse signals. As a pulse signal appears at matrix terminal M9, it is amplified by amplifier APA1 and applied over wire AD1, as a blocking voltage to And circuit A1UA (FIG. 12) of the up accelerating control circuits, thereby momentarily supplying the third and final input condition of that And circuit (the other two input conditions being supplied simultaneously, as has been previously described, over wires EXU and ACC). And circuit A1UA applies an output pulse signal to the grid circuit of first accelerating tube T1AC, which signal is of sufficient positive polarity and duration to overcome the applied negative bias of the tube, causing the tube to fire and conduct through its cathode-plate circuit. Tube T1AC remains in conducting condition once conduction is initiated. As tube T1AC conducts, current flows through coil 1ACC of the first accelerating switch through contacts NT2 of the stop time switch. Switch 1ACC, upon operation, engages its contacts 1ACC2 (FIG. 11), short-circuiting a portion of accelerating resistor RAC in the circuit of generator field winding GF, causing a corresponding increase in the car speed.

Switch 1ACC also engages its contacts 1ACC1 (FIG. 20), applying a "reset" pulse through condenser C2 to flip-flop FF2, thereby resetting the flip-flop to remove the blocking signal at its output wire EL, in preparation for a leveling operation at the next landing stop.

In a manner similar to that described for the first accelerating signal, the second and third pulse signals, appearing in sequence at matrix output terminals M10, M11 (FIG. 8) as the car moves past the second and third accelerating points, respectively, in the hoistway, are applied in sequence over wires AD2, AD3 to And circuits A2UA, A3UA (FIG. 12), respectively, causing second and third accelerating tubes T2AC and T3AC to fire and conduct, in sequence. In turn, their corresponding second and third accelerating switches 2ACC, 3ACC operate and engage their respective contacts 2ACC1, 3ACC1 (FIG. 11), in sequence, further short-circuiting corresponding portions of accelerating resistor RAC, thereby causing the car to accelerate to second and full speed in two steps.

As the car accelerates through first and second speeds to full speed, in moving upwardly from the second landing toward the third landing, first, second and full speed switches 1E, 2E, 3E (FIG. 13), as has been previously described, operate in sequence, in response to their respective corresponding speeds. First speed switch 1E, upon operation, engages its contacts 1E1, applying a blocking signal from supply line B+ over wire V1E to And circuit A2U1 (FIG. 14), thereby supplying the second input condition of that And circuit (the first input condition being simultaneously supplied by a blocking signal over wire TCP2, as has been previously explained). And circuit A2U1 produces an output signal which is applied to the grid circuit of advancer tube TAP3 through contacts XU6 (presently engaged) of the up direction memory switch and contacts Z4 of the advancer disabling switch. This signal is of a magnitude and positive polarity to overcome the negative bias applied to tube TAP3 sufficiently to cause it to fire and conduct through its plate-cathode circuit, extending through common plate resistor RP and the cathode, resistor-capacitor circuit, consisting of resistor R3 and capacitor C3. As advancer tube TAP3 conducts, a certain magnitude of current flows in the cathode-plate circuit, through common plate resistor RP and cathode resistor R3, causing certain corresponding voltage drops to appear across such resistors. Capacitor C3 charges to the potential appearing at cathode electrode c of tube TAP3. Once conduction is initiated, tube TAP3 remains in conducting condition, the potential at its cathode electrode c appearing as a blocking voltage, at output wire ACP3 and indicating the position of the car to be fictitiously advanced to the third landing, without effect at this time.

As the car attains its second speed, second speed switch 2E (FIG. 13) operates and separates its contacts 2E1, causing first speed switch 1E to return to its unoperated condition, thereby removing the firing signal previously applied to the grid circuit of advancer tube TAP3 (FIG. 14). Switch 2E (FIG. 13) also engages its contacts 2E2, applying the potential of supply line B+, as a blocking voltage, over wire V2E, to And circuit A2U2 (FIG. 14), thereby supplying the second input condition to that And circuit. And circuit A2U2 applies a firing signal to the grid circuit of advancer tube TAP4 through up direction memory switch contacts XU5 (presently engaged) and advancer disabling switch contacts Z3. The operation of the circuits of advancer tubes TAP1–6 is similar to that previously described for the true car position memory circuit MTCP (FIG. 8), i.e., with one tube in conducting condition, when a firing signal is applied to a second tube, conduction is transferred from the first to the second tube, which conduction, once initiated, is maintained until a subsequent firing signal is applied to a third tube, again transferring conduction. Thus, the firing signal applied to advancer tube TAP4 (FIG. 14) causes conduction to be transferred from tube TAP3 to TAP4, removing the signal appearing at wire ACP3 (indicating a ctitiously advanced position of the car at the third landing) and causing, instead, a signal (the potential at the athode electrode c of tube TAP4) to appear at wire .CP4 as an indication of a fictitiously advanced position f the car at the fourth landing, but without effect at his time.

As the car attains full speed, switch 3E (FIG. 13), as as been previously described, operates and separates its ontacts 3E1, causing second speed switch 2E to return unoperated condition, thereby removing the previously pplied firing signal from advancer tube TAP4 (FIG. 14). witch 3E (FIG. 13) also engages its contacts 3E2 aplying a blocking signal over wire V3E to And circuit 2U3 (FIG. 14), thereby supplying its second input ondition. This And circuit applies a firing signal through ontacts XU3, Z2 to the grid circuit of advancer tube 'AP5, which signal, in the manner previously described or the transfer of the output signal from wire ACP3 ACP4, causes conduction to be transferred from tube 'AP4 to TAP5, the output signal being, in turn, transerred from wire ACP4 to ACP5, indicating a fictitiously dvanced position of the car to the fifth landing. This gnal is applied over wire ACP5 to And circuits 5AYU, AYD (FIG. 22) of the advancer disabling circuits, locking one of their respective two input paths, without ffect at this time.

Speed switches 1E, 2E and 3E (FIG. 13), as they seuentially operate, also apply over their respective outut wires V1E, V2E and V3E blocking signals, in seuench, to And circuits 1A1UD to 3A1UD, 1A2UD to A2UD and 1A3UD to 3A3UD (FIG. 12), associated 'ith deceleration control during up travel, for purposes be explained hereinafter.

With the position of the car fictitiously advanced to the fth landing for which an up hall call is registered, the econd input condition of And circuit 15AU5 (FIG. 15) supplied over wire ACP5 (the first condition, as reviously explained, being supplied simultaneously over 'ire E5U), causing the And circuit to produce an output gnal. This output signal, indicating the coincidence of e fictitiously advanced car position with the location f the registered up call at the fifth landing, is applied s a firing signal to the grid circuit of up hall cancelling ube TU5, without effect at this time, since contacts US2 f the up stopping switch are presently open in the plate ircuit of the tube. This signal is also applied through locking diode VU5, as a firing signal to the grid circuit f up stop memory tube TUS, causing the tube to fire nd conduct through its cathode-plate circuit, extending rough cathode resistor RUS and contacts R01 of the op switch. Tube TUS, once conduction is initiated, reains in conducting condition. As the current flows in e cathode-plate circuit of tube TUS, a certain voltage rop appears across cathode resistor RUS, causing a ertain potential to appear at cathode electrode c of the ube. This potential is applied through blocking diode 'US, as a firing signal, to the grid circuit of stop initiating ube TXUS, causing that tube to fire and conduct through s cathode-plate circuit on positive half cycles of the pplied plate voltage, the circuit extending from supply ne B0 through coil US of the up stopping switch, tube 'XUS, contacts CXU3 of the up call reversal switch, S7 of the down stopping switch and XD11 of the down irection memory switch to supply line AC.

As stop initiating tube TXUS conducts, current flows rough coil US of the up stopping switch, causing the witch to operate. Switch US engages its contacts US2, pplying plate voltage to up hall call cancelling tubes 'U1–5 and car call cancelling tubes TC1–6. This causes ube TU5, associated with up landing calls at the fifth nding (and to which a firing signal is presently applied om the output of And circuit 15AU5), to fire and onduct through its cathode-plate circuit on positive alf cycles of the applied plate voltage. As tube TU5 onducts, current flows through its cathode resistor R5, causing a potential to appear at its cathode electrode c. The potential is applied through blocking diode 5VU and over wire E5U to the cathode electrode c of touch button tube 5U (FIGURE 9) for the fifth landing, and is of a magnitude and polarity to cause cathode electrode c of tube 5U to become sufficiently positive with respect to its anode electrode AN to cause the touch button tube to cease conducting and extinguish, thereby cancelling the up hall call at the fifth landing.

Switch US (FIGURE 15) also engages its contacts US1 (FIGURE 17), preparing a path over wire EUS to the input of amplifier APA1, for purposes to be explained hereinafter. Switch US (FIGURE 15) also engages its contacts US6, preparing a second firing circuit for tube TXUS, for purposes to be explained later, and separates its contacts US5, without effect at this time.

The potential at cathode electrode c of up stop memory tube TUS is also applied over wire EUS through contacts US1 (FIGURE 17) to the input of amplifier APA1 which amplifies the signal and applies it to And circuit AR0, satisfying one input condition of that And circuit, without effect at this time.

The signal appearing at the cathode electrode c of tube TUS (FIGURE 15) is further applied over wire EUS to the input of amplifier APAUS (FIGURE 18) of the advancer disabling circuits, where it is amplified and applied to the input of And circuit AD, thereby satisfying its second input condition, its first input condition being supplied over wire EYD by presently separated contacts XU13 (FIGURE 22), as has been previously explained. And circuit AD (FIGURE 18) produces an output signal which is applied to the grid circuit of tube TZ, causing the tube to fire and conduct through its cathode-plate circuit. Tube TZ is maintained in conducting condition, once conduction is initiated.

As tube TZ conducts, current flows through coil Z of the advancer disabling switch, causing the switch to operate. Switch Z separates its contacts Z1 to Z6 (FIGURE 14) in the grid circuits of the advancer tubes TAP1–6, respectively, thereby preventing the position of the car from being fictitiously advanced further. Switch Z also engages its contacts Z9 (FIGURE 16), preparing the counter circuits for deceleration control of the car. Switch Z further separates its contacts Z7 (FIGURE 12a) and engages its contacts Z8 resetting flip-flop circuit FF1 to transfer its output signal from wire ACC to DEC. This causes removal of the blocking signals applied over wire ACC to the acceleration control And circuits of FIGURE 12, and the application of blocking signals to the And circuits of FIGURE 12 associated with deceleration control, thereby preparing the deceleration control circuits.

As the car, while travelling at full speed toward the third landing, passes the acceleration-deceleration point in the hoistway corresponding to tape row AD4 (FIGURE 2), the code of that row is translated by the decoding circuits of FIGURE 8, as has been previously described, to produce an output pulse signal at matrix output terminal M12. This pulse signal is amplified by amplifier APA4 and applied over wire AD4 to And circuit 3A1UD (FIGURE 12), thereby blocking the fifth input path of that And circuit, its other four input paths, as has been stated, being simultaneously blocked. And circuit 3A1UD produces an output pulse signal which is applied to the grid circuit of first decelerating tube T1DC, causing the tube to fire and conduct through its cathode-plate circuit which includes coil 1DEC of the first decelerating switch. Tube T1DC, once conduction is initiated, is maintained in conducting condition, notwithstanding the subsequent removal of its firing signal. Switch 1DEC, upon operation, separates its contacts 1DEC1 (FIGURE 11) inserting a portion of deceleration resistor RDC in the circuit of separately excited generator field winding GF, thereby causing the car to decelerate.

As the car moves past the third landing, the code of tape row TCP3 (FIGURE 2) is translated into an output pulse signal which appears at matrix output terminal M3 (FIGURE 8). This pulse signal causes conduction to be transferred from memory tube TC2 to tube TC3, thereby removing the signal from wire TCP2 and providing a signal at wire TCP3 to indicate a memory of the car moving past the third landing, as has been previously described. This causes the input path to And circuit A2U (FIGURE 10), over wire TCP2 to become unblocked while the second input path to And circuit A3U is blocked over wire TCP3, thereby removing the output signal from And circuit A2U and replacing it substantially instantaneously with an output signal from And circuit A3U; this transfer of signals maintains the firing signal applied to tube TXU by And circuit AXU and, in turn, is effective to maintain up direction memory switch XU in operated condition.

The pulse signal appearing at matrix output terminal M3 (FIGURE 8) is also applied through blocking diode VC3 to the input of amplifier APA7, where it is amplified and, in turn, applied over wire LCP through contacts Z9 (FIGURE 16), which are presently engaged, to one side of capacitor CE in the counter circuits. This causes capacitor CE to apply a pulse of predetermined duration and amplitude to the inputs of And circuits AE1 to AE3, thereby blocking the second input path of And circuit AE1, its first input path being simultaneously blocked by the potential appearing at cathode electrode c of tube TE0, which potential indicates a count of zero, as has been previously described. And circuit AE1 produces an output pulse signal which is applied to the grid circuits of tube TE1, causing the tube to fire and conduct through its cathode-plate circuit, conduction, once initiated, being maintained. Conduction of tube TE1 causes tube TE0 to extinguish, in a manner similar to that previously described for the transfer of conduction from one tube to another in the true car position memory circuits MTCP of FIGURE 8. As tube TE0 ceases to conduct, the signal appearing at wire E0, indicating a zero count, is removed, causing the first input path of And circuit AE1 to become unblocked. As tube TE1 conducts, current flows through its cathode resistor R1, causing a certtain potential to appear at its cathode electrode c, which potential blocks the first input path of And circuit AE2, preparing it for the next count. This potential is also applied over wire E1 to block the fourth input path of And circuit 3A2UD (FIGURE 12), (three of the four other paths being blocked over wires EXU, DEC and V3E, as has been stated), preparing the deceleration control circuits for the next step of deceleration.

As the car in travelling toward the fourth landing, moves past the point in the hoistway, corresponding to tape row AD5 (not shown) for the fifth acceleration-deceleration point positioned between the third and fourth landings, a pulse signal appears at matrix output terminal M13 (FIG. 8), corresponding to such point. The pulse is amplified by amplifier APA5 and applied over wire AD5 to block the fifth input path of And circuit 3A2UD (FIG. 12), causing that And circuit to produce an output pulse which is, in turn, applied to the grid circuit of second decelerating tube T2DC, causing the tube to fire and conduct through its cathode-plate circuit which includes coil 2DEC of the second deceleration switch. Switch 2DEC, upon operation, separates its contacts 2DEC1 (FIG. 11), inserting a second portion of deceleration resistor RDC in the circuit of generator field winding GF, thereby causing the car to decelerate further.

As the car moves past the fourth landing, while travelling toward the fifth landing stop, an output pulse is produced at matrix output terminal M4 (FIG. 8), corresponding to the position of the car at the fourth landing, as has been previously described. This pulse causes conduction to be transferred from memory tube TC3 to TC4, thereby, in turn, transferring the output signal from wire TCP3 to TCP4, indicating a memory of the car at the fourth landing. In a manner similar to that previously described for the car passing the third landing, the transfer of the car position memory signal from wire TCP3 to TCP4 causes the output of And circuit A3U (FIG. 10) to be transferred substantially instantaneously to And circuit A4U thereby maintaining switch XU in operating condition.

The pulse appearing at matrix output terminal M4 (FIG. 8) is also applied through blocking diode VC4 and amplifier APA7 over wire LCP to the counter circuits of FIG. 16, thereby causing, as has been previously described, a pulse of a certain duration to block momentarily the second input paths of And circuits AE1 to AE3. This causes And circuit AE2 whose first input path is also blocked by the signal at cathode electrode c of tube TE1, to apply an output pulse to the grid circuit of tube TE2, causing conduction to be transferred from tube TE1 to TE2, as has been previously described, for transfer of conduction from tube TE0 to TE1. As tube TE1 ceases to conduct, the blocking signal obtained at its cathode electrode c is removed, without effect. As tube TE2 conducts, current flows through its cathode resistor R2, causing a certain potential to appear at its cathode electrode c. This potential blocks one input path to And circuit AE3 in preparation for the next count, and over wire E2, is applied to the input of And circuit 3A3UD (FIG. 12), thereby blocking its fourth input path, preparing the decelaration control circuits for the final step of deceleration.

As the car in its approach to the fifth landing passes an acceleration-deceleration point in the hoistway, corresponding to tape row AD6 (not shown), which point is a certain final slowdown distance from the fifth landing, the code of tape row AD5 is translated by the circuits of FIG. 8, as has been described, to produce an output pulse at matrix output terminal M14. This pulse is amplified by amplifier APA6 and applied over wire AD6 to block the fifth input path of And circuit 3A3UD (FIG. 12). This causes the And circuit to apply a firing signal to the grid circuit of third deceleration tube T3DC, causing it to fire and conduct through its cathode-plate circuit which includes coil 3DEC of the third deceleration switch. Switch 3DEC, upon operation, separates its contacts 3DEC3 (FIG. 11), inserting the remainder of the acceleration resistor RDC in the circuit of generator field winding GF, causing the car to begin its final step of slowdown for a stop at the fifth landing.

Switch 3DEC also separates its contacts 3DEC2 (FIG. 13) interrupting the plate supply to tube T3E of the car speed circuits, thereby causing the tube to extinguish and cease conducting, and also interrupting the circuit through coil 3E of the full speed switch, which switch returns to unoperated condition in preparation for a subsequent trip of the car.

Switch 3DEC also engages its contacts 3DEC1 (FIG. 20), applying the potential B+ to the left side of capacitor C1 causing the capacitor to apply a "set" pulse to flip-flop FF2. The flip-flop produces an output signal which is applied over wire EL to And circuits ALU, ALD (FIG. 21), blocking one input path of each And circuit, thereby preparing them for leveling operation of the car at the fifth landing stop.

As the car arrives at the fifth landing, a signal appears at matrix output terminal M5 (FIG. 8), causing conduction to be transferred from memory tube TC4 to TC5. The removal of the signal from wire TCP4 unblocks one input path of And circuit A4U (FIG. 10), thereby, in turn, removing the blocking signal applied through amplifier APBU to And circuit AXU. This causes And circuit AXU to remove the firing signal from tube TXU, which tube then ceases to conduct and is extinguished on the next negative half cycle of the applied plate voltage. As tube TXU ceases to conduct, switch XU, connected in its plate circuit, returns to unoperated condition, thereby losing its memory of up direction of car travel.

The signal, indicating the position of the car at the :th landing, is applied over wire TCP5 to block the sec-ıd input path of And circuit A5 (FIG. 17), causing to produce an output signal which indicates that the ue position of the car coincides with the fictitiously ad-ınced position of the car (indicated by the blocking sig-ıl applied over wire ACP5) at the fifth landing. The out-ıt of And circuit A5 is amplified by amplifier APA2 and ɔplied to And circuit AR0, blocking the second input ıth of the latter And circuit, its first input path, as has een previously stated, being simultaneously blocked from signal applied over wire EUS through contacts US1 presently engaged) and amplifier APA1. And circuit AR0 roduces an output signal which is applied to the grid ircuit of tube TR0, causing the tube to fire and conduct n positive half cycles of its applied plate voltage through s cathode-plate circuit which includes coil R0 of the op switch which operates. Polarizing diode V, connected cross coil R0, maintains the switch operated between ıccessive positive half cycles of the applied plate volt-ge.

Stop switch R0 separates its contacts R01 (FIG. 15), ıterrupting the plate supply to up stop memory tube TUS, ıereby causing the tube to cease conducting and extin-uish. This causes the removal of the firing signal applied om cathode electrode c of the tube through blocking iode VUS and resistor RTU to the grid circuit of tube XUS. However, switch R0 also engages its contacts R03, pplying a firing signal to tube TXUS from supply line + through resistor RL and contacts US6 (presently en-ıged) to maintain the tube conducting on positive half ycles of its applied plate voltage.

Switch R0 also engages its contacts R02 (FIGURE 11), ɔmpleting a circuit for coil NT of the stop time switch nd timing condenser CNT, connected through timing esistor RNT across coil NT. Capacitor CNT charges ırough resistor RNT to the potential of supply line B+.

Switch NT, upon operation, separates its contacts NT10, ıterrupting the circuit through coils U and H of the up witch and brake switch, respectively. Switch U releases, eparating its contacts U3, U4, thereby interrupting the ircuit of generator field winding GF, removing power om the hoisting motor. Brake switch H releases, sepa-ating its contacts H2 in the generator field winding cir-uit and separating its contacts H1, interrupting the cir-uit of brake release coil BR, causing application of the rake to bring the car to a stop at the fifth landing. Switch J also separates its self holding contacts U1.

Switch NT also separates its contact NT2 (FIGURE 2), causing return to unoperated condition of acceler-tion control tubes T1AC to T3AC together with their ssociated switches 1ACC to 3ACC and of deceleration ontrol tubes T1DC to T3DC together with their asso-iated switches 1DEC to 3DEC, thereby reinserting ac-eleration resistor RAC (FIGURE 11) in the circuit of enerator field winding GF, and removing therefrom de-eleration resistor RDC, in preparation for restarting oper-tion of the car. Third deceleration switch 3DEC (FIG-JRE 12), upon releasing, also reengages its contacts DEC2 (FIGURE 13), again applying plate voltage to car peed tubes T1E to T3E, in preparation for the next trip f the car.

Switch NT further engages its contacts NT13 (FIG-JRE 16), transferring conduction from counter tube E2 to tube TE0, thereby resetting the counter to zero, s has been previously explained. It also separates its ontacts NT1 (FIGURE 18) interrupting the plate cir-uit of advancer tube TZ and the circuit of coil Z of ıe advancer disabling switch, causing the switch to re-ırn to unoperated condition, in preparation for the next ·ip of the car. Switch Z reseparates its contacts Z9 (FIG-JRE 16), preventing any counting operation until ini-ation of a subsequent landing stop.

Switch NT (FIGURE 11) further engages its contacts NT12, preparing the leveling control circuits, and engages its contacts NT14 (FIG. 15) connected in parallel across contacts R03, for purposes to be explained later.

As tube TUS ceases to conduct, the signal applied over wire EUS to amplifier APA1 (FIGURE 17) through contacts US1 is also removed, causing the output of the amplifier to be removed, thereby effectively unblocking one input path of And circuit AR0. And circuit AR0 ceases to apply a firing signal to the grid circuit of tube TR0, causing the tube to cease firing and extinguish during the next negative half cycle of its applied plate voltage. As current ceases to flow in the plate circuit of tube TR0 and, in turn, through coil R0 of the stop switch, the switch releases, again separating its contacts R03 (FIGURE 15) and engaging its contacts R01, without effect. Switch R0 also separates its contacts R02 (FIGURE 11), interrupting the circuit of coil NT of the stop time switch, and disconnecting timing condenser CNT from supply line B+. Condenser CNT starts to discharge through timing resistor RNT and coil NT, maintaining stop time switch NT in operated condition for a certain time, termed the stop time, to allow the opening of the doors and passenger transfer at the landing stop, before initiating the reclosing of the doors in the presence of a further demand for service, as will be described hereinafter.

Should the car, in stopping "overshoot" the fifth landing by at least a predetermined minimum distance, leveling operation of the car is initiated to return the car to the landing level. As the car moves past a leveling point, located that minimum distance above that landing, which point corresponds to tape row LD (not shown) for the fifth landing, the code of row LD is translated by the matrix of FIGURE 8 to produce an output pulse signal at matrix output terminal M8, indicating that the car must level back down to the fifth landing. This output pulse is applied over wire LD to the grid circuits of tube TDL2 (FIGURE 19) of down leveling timer LTD, causing the tube to fire and conduct through its cathode-plate circuit, which conduction is maintained after removal of the firing pulse to its grid circuit. As tube TLD2 conducts, current flows through its plate resistor RLD2, causing a certain voltage drop to appear across that resistor and, in turn, decreasing the potential at the left-hand side of capacitor CPD from the potential of supply line B+ to the potential appearing at the plate electrode p of tube TLD2. Since the potential appearing across capacitor CPD can not change instantaneously, the potential at its right side and, in turn, at the plate electrode p of tube TLD1 (presently conducting as has been previously stated), decreases, lowering the potential applied across the cathode-plate circuit of tube TLD1 below its sustaining value, thereby causing tube TLD1 to extinguish and cease conducting. As tube TLD1 ceases to conduct, the potential of its plate electrode p moves toward that of supply line B+, causing current to flow from supply line B+ through the resistor-capacitor timing circuit, consisting of resistors RLD1, RD1, RD2 and capacitor CD1, thereby causing capacitor CD1 to begin charging at a predetermined rate, for purposes to be explained hereinafter. The potential at the plate electrode p of tube TLD1 is applied over wire ETD to block the second input path of And circuit ALD (FIGURE 21), causing that And circuit to apply a firing signal to the grid circuit of tube TXDL. Tube TXDL fires and conducts through its cathode-plate circuit on positive half cycles of the applied plate voltage. As tube TXDL conducts, current flows through coil TDL of the auxiliary down leveling switch, causing the switch to operate. Switch TDL is selected with a relatively slow "Drop-out" time, so as to remain operated between successive positive half cycles of the applied plate voltage of tube TXDL.

Switch TDL engages its contacts TDL2 (FIGURE 11), completing a circuit for coil DL of the down leveling switch and coil H of the brake switch, the circuit extending from supply line B+ through contacts TDL2, coil DL, contacts UL1, NT12 (presently engaged), DC0 and coil H to supply line B0.

Swith DL, upon operation, engages its contacts DL2, DL3, preparing the leveling control circuits of generator field winding GF through down leveling resistor RDL for down movement of the car at a certain leveling speed. Switch H, upon operation, engages its contacts H1, completing a circuit for brake release coil BR, thereby releasing the brake, and engages its contacts H2, completing a down leveling circuit for generator field winding GF, the latter circuit extending from supply line B+ through contacts H2, acceleration resistor RAC, contacts DL3, down leveling resistor RDL, generator field winding GF and contacts DL2, 1DEC1, 2DEC1 and 3DEC3 to supply line B0.

The car moves back toward the fifth landing, and, at the end of a certain time predetermined to coincide with the arrival of the car at a level with the fifth landing, timing condenser CD1 (FIGURE 19) charges sufficiently through its timing circuit to cause tube TLD1 to fire and conduct through its cathode-plate circuit, which conduction causes tube TLD2 to cease firing and extinguish in a manner similar to that previously described for transfer of conduction from tube TLD2 to TLD1.

As tube TLD1 conducts, substantially the entire applied plate voltage appears as a voltage drop across its plate resistor RLD1, effectively causing removal of the blocking signal previously applied over wire ETD to And circuit ALD (FIG. 21). This effectively unblocks one input path of the And circuit, removing its output signal, applied to the grid circuit of tube TXDL, thereby causing the tube to cease conducting and extinguish on the next negative half cycle of its applied plate voltage. As tube TXDL ceases to conduct, current ceases to flow through coil TDL, causing the switch to release.

Switch TDL separates its contacts TDL2 (FIG. 11), interrupting the circuit for coils DL and H of the down leveling switch and brake switch, respectively. Switch DL, upon releasing, separates its contacts DL2, DL3 in the leveling control circuit of generator field winding GF, removing power from the hoisting motor, while brake switch H, upon releasing, separates its contacts H2 in the generator field winding circuit and in the brake release coil circuit, causing application of the brake to stop the car level with the fifth landing.

Should timing condenser CD1 (FIG. 19) of the down leveling timer LTD fail to charge sufficiently to cause conduction to be transferred from tube TLD2 to TLD1 to stop downward leveling movement of the car, as the car arrives at the fifth landing, as has been described, a signal, indicating its arrival at the fifth landing, appears at matrix output terminal M5 (FIG. 8), as has been previously described. This signal is applied through blocking diode VC5 and amplifier APA7 over wire LCP to the grid circuits of tube TLD of the down leveling timer LTD, causing transfer of conduction from tube TLD2 to TLD1 and the consequent removal of power from the hoisting motor and application of the brake to stop the car level with the fifth landing, as has been described.

Should the car, while leveling downward "overshoot" the fifth landing and move below it at least a certain minimum distance to an up leveling point corresponding to tape row LU (not shown), an output pulse appears at matrix output terminal M7 (FIG. 8) which, over wire LU, is applied to the circuits of up leveling timer LTU, causing the car to move back up to the fifth landing at a certain leveling speed through the operation of auxiliary up leveling switch TUL (FIG. 21) and up leveling switch UL (FIG. 11), in a manner similar to that described for down leveling of the car.

It may be noted that prior to the expiration of the stop time (determined by the timing out of switch NT (FIG. 11), preference is given to demand registered in the direction in which the car last travelled to the fifth landing, i.e., the up direction of travel. This is so, since switch US (FIG. 15) is maintained in operated condition by means of contacts NT14 until the expiration of the stop time. Thus, switch US maintains its contacts US3 (FIG. 10) separated, disabling, during the stop time, the circuits for down direction of car travel, while maintaining its contacts US7 engaged, blocking one input path of And circuit AXU in the up direction circuits, thereby preparing the up circuits for initiating up travel of the car in response to demand for landings located above the present position of the car at the fifth landing.

For example, assume that prior to the expiration of the stop time a call is registered for the sixth landing by a passenger entering the car and touching the sixth floor touch button 6C (FIG. 9). Under such conditions, touch button 6C conducts, causing, in a manner similar to that previously described for touch button 5D, a blocking signal to be applied over wire A′ to And circuit A5U (FIG. 10), satisfying the second input condition of that And circuit, thereby causing it to produce an output signal which is applied through amplifier APBU to block the second input of And circuit AXU. And circuit AXU produces an output signal which is applied to the grid circuit of TXU, causing it to fire and conduct and, in turn, operate switch XU. Switch XU, as has been described, conditions the car for travel in the up direction at the expiration of the stop time. At the expiration of the stop time, switch NT releases, engaging its contacts NT4 (FIG. 10) to maintain switch XU in operated condition. It also engages its contacts NT10 (FIG. 11), causing the car to start in the up direction, when the car and hoistway doors close, as has been previously described.

On the other hand, if, prior to the expiration of the stop time, a call is not registered for a landing located above the position of the car, the car loses its direction preference, as switch NT (FIG. 11) releases. In such a case, switch NT separates its contacts NT14 (FIG. 15), removing the firing signal from the grid circuit of tube TXUS which ceases to conduct and extinguishes on the next negative half cycle of its applied plate voltage. As tube TXUS ceases to conduct, switch US releases and reengages its contacts US3 (FIG. 10), enabling the down direction circuits. Switch NT also engages its contacts NT8, allowing the down direction circuits to respond to calls for landings located below the position of the car, and engages its contacts NT4 in the up direction circuits, preparing the up direction circuits, thereby allowing the car to respond also to calls for landings located above its position. The car may then respond to calls for landings above or below it, depending upon which are first registered. As has been previously stated, in the absence of further demand and at the expiration of the stop time, the car remains parked at the fifth landing with the car and hoistway doors fully opened, until service demand is registered.

In order to describe reversal operation of the car, next assume that the car is parked at the second landing, as in the previous example, and down calls are registered at the fourth and fifth landings. Under such conditions, tubes T3, T4 (FIG. 23) are in conducting condition, a firing signal, causing conduction, having been applied to their respective grid circuits by the engagement of contacts NT11, incident to the arrival of the car at the second landing on its last trip. Touch button tubes 4D and 5D (FIG. 9) are in conducting condition, indicating the registration of down landing calls at the fourth and fifth landings, respectively, and causing, as has been previously described, blocking signals to be applied to the circuits of FIGS. 10 and 12 over wires F′, B′, G′, C′, D′ and E′, and over wires E5D and E4D to the circuits of FIG. 15, and, in addition, initiating the closing of the car and hoistway doors (not shown). Thus, both input conditions of And circuit A2U (FIG. 10) are supplied simultaneously (over wires D′, TCP2), causing, in turn, the second input condition of And circuit AXU to be also supplied, and the consequent operation of switch XU to initiate, when the car and hoistway doors reach their fully closed position, starting of the car in the up direction, as has been previously described.

As has also been previously described, the car is accelated upward and its position is fictitiously advanced in response to its speed. As the position of the car is fictitiously advanced to the third landing, the second input condition of And circuit 3AYU (FIG. 22) is supplied over wire ACP3, causing it to produce an output signal which biases the base electrode b of transistor GT4 sufficiently positive with respect to its emitter electrode e to cause conduction through its emitter-collector circuit. Transistor GT4, while conducting, provides an extremely low impedance path for current flow from supply line B+ through its emitter-collector circuit to supply line B1+, effectively removing the blocking signal previously appearing at wire EYU, and instead supplying a low impedance path to signals of positive polarity applied to wire EYU, for purposes to be explained hereinafter.

As the position of the car is fictitiously advanced to the fourth landing, a blocking signal is transferred from wire ACP3 to ACP4 (FIG. 14), unblocking one input path of And circuit 3AYU (FIG. 22) and blocking the second input path of And circuit 4AYU, thereby causing the substantially instantaneous transfer of the output of And circuit 3AYU to 4AYU to maintain transistor GT4 in conducting condition. At the same time, the second input condition of And circuit 15AD4 (FIG. 15) is supplied over wire ACP4, causing it to produce an output signal which is supplied through blocking diode VD4 to the grid circuit of tube TDS. This causes the tube to fire and conduct, which conduction, once initiated, is maintained. A potential, appearing at the cathode electrode c of tube TDS, is applied through blocking diode VDS and resistor RTD to the grid circuit of stop initiating tube TXDS, but without effect, since contacts XU9 of the up direction memory switch in its cathode-plate circuit are presently separated. This potential is also applied over wire EDS to amplifier APADS (FIG. 18) of the advancer disabling circuits, where it is amplified and applied to And circuit AU, blocking one of its input paths. This is without effect on the advancer disabling circuits, since the second input path of And circuit AU is presently unblocked over wire EYU; transistor GT4 (FIG. 22) being in conducting condition to provide a low impedance, as has been described. Thus, a stop at the fourth landing in response to the down call registered thereat is not initiated and the position of the car, in response to its speed, is fictitiously further advanced to the fifth landing. The foregoing potential is also applied over wire EDS to And circuit ACXU (FIG. 23), blocking the second input path of that And circuit, its first input path being simultaneously blocked over wire EU through presently engaged contacts U5 (FIG. 11), for purposes to be explained.

As the position of the car is fictitiously advanced to the fifth landing, the blocking signal applied over wire ACP4 to And circuit 4AYU (FIG. 22) is transferred to And circuit 5AYU over wire ACP5, thereby removing the conducting bias applied by And circuit 4AYU to the base-emitter circuit of transistor GT4. Transistor GT4 ceases to conduct, causing the potential or supply line B+ again to be supplied over wire EYU to block the second input path of And circuit AU (FIG. 18). This causes And circuit AU to produce an output signal which is applied to the grid circuit of tube TZ, which then fires and conducts through its cathode-plate circuit. The blocking signal over wire ACP5 (FIG. 15), indicating the fictitiously advanced position of the car at the fifth landing, also blocks the second input path of And circuit 15AD5, causing it to produce an output signal, without effect at this time.

As tube TZ conducts, current flows through coil Z of the advancer disabling switch, causing it to operate, disabling the advancer circuits and initiating deceleration and stopping of the car at the fifth landing, as has been previously described. Switch Z also engages its contacts Z9, applying the potential of supply line B+ over wire EZ to And circuit ACXU (FIG. 23), blocking its third input path, its other two input paths being blocked simultaneously over wires EU, EDS, as has been stated. And circuit ACXU (FIG. 23) applies a firing signal to the grid circuit of tube TCXU, causing it to fire and conduct through its cathode-plate circuit, extending through coil CXU of the up call reversal switch and contacts US4. As tube TCXU conducts, the potential at its plate electrode p is decreased from the potential of supply line B+ to the voltage drop across the tube. Since the voltage across common plate capacitor CP3 cannot change instantaneously, the potential at plate electrode p of tube T3 is decreased to where the voltage drop appearing across the tube falls below the tube sustaining value, causing it to cease conducting and extinguish.

Switch CXU, upon operation, engages its contacts CXU4 (FIG. 15), completing the cathode-plate circuit of tube TXDS, thereby causing it to fire and conduct through its cathode-plate circuit which includes coil DS of the down stopping switch. Switch CXU also separates its contacts CXU1 in the up call cancelling circuits and CXU3 in the up stop initiating circuits, disabling them, while engaging its contacts CXU2, preparing the down call cancelling circuits for operation.

Switch DS, upon operation, separates its contacts DS2 (FIG. 10), preventing later registered calls for landings above from interfering with reversal of the car to down. It also engages its contacts DS3 (FIG. 17), completing the second input condition through amplifier APA1 of And circuit AR0, preparing that circuit. As the car arrives at the fifth landing the true car position coincides with the advanced car position, causing an output to be applied to And circuit AR0 from And circuit A5, thereby causing switch R0 to operate and stop the car by, in turn, causing switch NT (FIG. 11) to operate, as has been previously described.

Switch DS also engages its contacts DS1 (FIG. 15), applying plate voltage to down landing call cancelling tube TD5 which fires and conduts, thereby cancelling the fifth landing down call, as previously described for the fifth landing up call.

At the expiration of the stop time, the car and hoistway doors close and the car proceeds in the down direction in response to the down call at the fourth landing, it being understood that operation of the car in the down direction is similar to that described for up travel of the car, except that down direction control circuits are utilized instead of up.

As changes can be made in the above described construction and many apparently different embodiments of this invention can be made without departing from the scope thereof, it is intended that all matter contained in the above description or shown on the accompanying drawings be interpreted as illustrative only and not in a limiting sense.

What is claimed is:

1. In combination with an elevator car arranged for vertical movement in a hoistway and serving a plurality of landings, a plurality of electric signal producing means, each having two output terminals, means responsive to car movement for selectively energizing said signal producing means in predetermined binary coded combinations corresponding to the location of said car at preselected positions in said hoistway, diode matrix means having a plurality of input terminals electrically connected to said output terminals of said signal producing means and also having a plurality of output terminals, one for each of said preselected positions, said diode matrix means being arranged to decode said predetermined coded combinations by selectively producing in response thereto electrical signals at said matrix output terminals in accordance with the corresponding location of said car, and enabling means with two output terminals responsive to the location of said car outside a predetermined region located at each said preselected position to prevent said diode matrix means from decoding notwithstanding the production of one of said predetermined coded combinations, said enabling means being operable when the car enters any one of said predetermined regions to enable said diode matrix means to decode the predetermined coded combination produced for the position at which the car is located, each of said electric signal producing means and said enabling means including a unidirectional power source and a photosensitive cell having a certain resistive impedance which in response to light striking said cell is substantially reduced, each said switch being operable from a first condition to a second condition by light striking said cell and back to said first condition when said cell is shielded from light, each said switch when in said first condition connecting said power source to its associated output terminals in a first certain manner and when operated to said second condition interchanging the connection of said power source to its associated output terminals.

2. In combination with an elevator car arranged for vertical movement in a hoistway and serving a plurality of landings, a plurality of electric signal producing means, each having two output terminals, energizing means responsive to car movement for selectively energizing said signal producing means in predetermined binary coded combinations corresponding to the location of said car at preselected positions in said hoistway, diode matrix means having a plurality of input terminals electrically connected to said output terminals of said signal producing means and also having a plurality of output terminals, one for each of said preselected positions, said diode matrix means being arranged to decode said predetermined coded combinations by selectively producing in response thereto electrical signals at said matrix output terminals in accordance with the corresponding location of said car, and enabling means with two output terminals responsive to the location of said car outside a predetermined region located at each said preselected position to prevent said diode matrix means from decoding notwithstanding the production of one of said predetermined coded combinations, said enabling means being operable when the car enters any one of said predetermined regions to enable said diode matrix means to decode the predetermined coded combination produced for the position at which the car is located, each of said signal producing means including a first photosensitive cell and being adapted to be energized by radiant energy striking its cell to selectively produce signals at its output terminals, said energizing means including a radiant energy source and a light shield in the form of a longitudinal tape adapted for longitudinal movement intermediate said first photosensitive cells and said source in accordance with car movement, said tape having first predetermined perforations positioned in rows spaced apart at predetermined points along its longitudinal dimension, said first perforations being positioned for alignment with corresponding ones of said first photosensitive cells in accordance with said binary code as their associated row passes between said radiant energy source and said first photosensitive cells for causing radiant energy selectively to energize said signal producing means in accordance with the position of said car in said hoistway, said enablng means including a second photosensitive cell, said radiant energy source and a light shield formed in said longitudinal tape and being adapted to be operable when its photosensitive cell is energized, said longitudinal tape having second perforations positioned in said spaced rows through which said second photosensitive cell is energized by said radiant energy source, said second perforations being smaller than said first perforations and being so located in said spaced rows so as to allow said second photosensitive cell to be energized only when said first perforations in any one row are so positioned as to permit the coincidental energization of all their corresponding first photosensitive cells.

3. In combination with an elevator car arranged for vertical movement in a hoistway and serving a plurality of landings, a plurality of electric signal producing means, each having two output terminals, means responsive to car movement for selectively energizing said signal producing means in predetermined binary coded combinations corresponding to the location of said car at preselected positions in said hoistway, diode matrix means having a plurality of input terminals electrically connected to said output terminals of said signal producing means and also having a plurality of output terminals, one for each of said preselected positions, said diode matrix means being arranged to decode said predetermined coded combinations by selectively producing in response thereto electrical signals at said matrix output terminals in accordance with the corresponding location of said car, and enabling means with two output terminals responsive to the location of said car outside a predetermined region located at each said preselected position to prevent said diode matrix means from decoding notwithstanding the production of one of said predetermined coded combinations, said enabling means being operable when the car enters any one of said predetermined regions to enable said diode matrix means to decode the predetermined coded combination produced for the position at which the car is located, each of said signal producing means and said enabling means including a direct current power source and a photosensitive switch interconnected therewith, each said switch including two transistors of the NPN junction type, each having base, collector and emitter electrodes, their emitter electrodes being connected directly to each other, a biasing resistor connecting the collector electrode of a first one of said transistors to the base electrode of the second one of said transistors, and a photosensitive cell having certain resistive impedance characteristics which decrease relatively substantially in ohmic value in response to light striking the cell, said cell being arranged in the base circuit of said first one transistor, said transistors being biased such that under conditions where said cell is shielded from light said first transistor is maintained in nonconducting condition and said second transistor conducts through its collector-emitter circuit causing a signal of a certain magnitude and of positive polarity to appear at one of said output terminals and a substantially zero signal at the other of said output terminals and under conditions where light strikes said photo cell conduction is transferred from said second to said first transistor causing the transfer of said signals between said output terminals.

4. In combination with an elevator car arranged for vertical movement in a hoistway and serving a plurality of landings, a plurality of electric signal producing means, each having two output terminals, means responsive to car movement for selectively energizing said signal producing means in predetermined binary coded combinations corresponding to the location of said car at preselected positions in said hoistway, diode matrix means having a plurality of input terminals electrically connected to said output terminals of said signal producing means and also having a plurality of output terminals, one for each of said preselected positions, said diode matrix means being arranged to decode said predetermined coded combinations by selectively producing in response thereto electrical signals at said matrix output terminals in accordance with the corresponding location of said car, and enabling means with two output terminals responsive to the location of said car outside a predetermined region located at each said preselected position to prevent said diode matrix means from decoding notwithstanding the production of one of said predetermined coded combinations, said enabling means being operable when the car enters any one of said predetermined regions to enable said diode matrix means to decode the predetermined coded combination produced for the position at which the car is located, each of said signal producing means and said enabling means including a photosensitive switch comprising two transistors of the NPN junction type, each having base, collector and emitter electrodes, their emitter electrodes being connected directly to each other; a biasing resistor connecting the collector electrode of a first one of said transistors to the base electrode of the second one of said transistors; means biasing the collector electrodes of said transistors positive with respect to their respective emitter electrodes and in turn through said biasing resistor the base electrode of said second one transistor positive with respect to its emitter electrode, and second biasing means including a photosensitive cell having certain resistive impedance characteristics which decrease relatively substantially in ohmic value in response to light striking the cell, said second biasing means being arranged in the base circuit of said first one transistor for biasing, under conditions where said cell is shielded from light, said first one transistor to nonconducting condition; said first biasing means under such conditions causing said second transistor to conduct through its collector-emitter circuit providing a low impedance path to current flow therethrough; said first biasing means also providing a signal of positive polarity at the collector electrode of said first transistor; said second biasing means causing, under conditions where light strikes said photo cell, the base electrode of said first transistor to become sufficiently positive with respect to its emitter electrode to cause conduction through the collector-emitter circuit of said first transistor and the transfer of conduction from said second to said first transistor to provide a low impedance path at its collector electrode while transferring said signal of positive polarity to the collector electrode of said second transistor.

5. In combination with an elevator car arranged for vertical movement in a hoistway and serving a plurality of landings, a plurality N of electric signal producing means, each of which includes a light cell responsive to light and is arranged to produce a signal in response to light striking its respective light cell, a light source for said light cells, light shield means for selectively shielding said light cells from light in response to vertical movement of said car in said hoistway as the car arrives at predetermined points therein with respect to said landings served, said shield means being arranged selectively to shield said cells to provide a certain separate combination of shielded and unshielded cells according to a certain code for the position of said car at each of said respective points causing said signal producing means to produce corresponding code signal combinations, said arrangement of said shield means being such that the number of said code combinations obtainable may be expressed by the formula 2N wherein N designates the number of signal producing means provided, and translating means operatively responsive to said coded signal combinations for converting each of said separate signal combinations to a respective corresponding control signal.

6. A combination as set forth in claim 5 wherein said light cells are mounted in said hoistway in spaced substantially horizontal alignment forming a row, wherein said light source is also mounted in said hoistway in position to project light upon said row of cells, and wherein said light shield means consists of a vertically extending tape of opaque material operatively connected to said car to duplicate its vertical movement in said hoistway and positioned between said light source and said row of cells to shield said cells from said light, said tape having certain slots defined therein and arranged in substantially horizontally extending rows spaced apart along the longitudinal dimension of said tape in accordance with certain corresponding positions of car in said hoistway, said slots being positioned in their respective rows for alignment with certain ones of said cells in accordance with a certain code as the tape duplicates car movement to unshield said certain ones of said cells from said light causing selective response of said cells in accordance with the position of said car in said hoistway.

7. An elevator system comprising, an elevator car serving a plurality of landings, including upper and lower terminal landings, car call registering means, one for each of said landings, up hall call registering means, one for each of said landings located below said upper terminal landing, down hall call registering means, one for each of said landings located above said lower terminal landing; comparison means including a plurality of up static circuit elements, one for each of said landings located below, and a plurality of down static circuit elements, one for each of said landings located above, each of said static circuit elements having two input conditions and operable under conditions where both said conditions are simultaneously provided for producing an output directional control signal, car position means responsive to the position of said car at said respective landings to provide separate signals indicating the presence of said car at such landings, memory means operable in response to said signals for maintaining a memory of the car position as the car travels between successive landings and providing a first input condition for the static circuit elements associated with the landing at which the car is positioned, means responsive to said car and hall call registering means under conditions where a call is registered for a landing for providing the second input condition for the up static circuit elements associated with landings located below the landing for which the call is registered and also to provide the second input condition for the down static circuit elements associated with landings located above the landing for which the call is registered, thereby providing both of said input conditions for the static circuit element corresponding to the present position of the car and the direction in which the car must travel in order to respond to said registered call to produce its respective directional control signal, and direction control mechanism responsive to such directional control signals from said up static circuit elements and said down static circuit elements to condition said car for travel in a direction associated with the directional control signal produced.

8. In an elevator installation in which an elevator car serves a plurality of landings, means for each landing for registering calls for service for such landings by providing a voltage signal, car position and location of service demand comparison means, including an up And circuit element for each landing located below the upper most landing and a down And circuit element for each landing located above the lowermost landing, each of said And elements having two input conditions and operable under conditions where both said conditions are simultaneously provided for producing an output control signal, means responsive to the position of said car at said respective landings to provide a first input condition for the And circuit elements associated with the landing at which the car is positioned until the car arrives at an adjacent landing, an up diode network including blocking diodes interconnecting said call registering means for landings above said lowermost landing with said up And circuit elements to transmit said voltage signals from the registering means of such landings above for which calls are registered to provide the second input condition of the up And circuit elements associated with landings located below the uppermost landing for which a call is registered while blocking transmission to the up And circuits for landings located above, and a down diode network including blocking diodes interconnecting said call registering means for landings below said uppermost landing with said down And circuit elements to transmit voltage signals from the registering means of such landings below to provide said second input condition for the down And circuit elements associated with landings located above the lowermost landing for which a call is registered while blocking transmission to the down And circuit elements for landings located below, and direction control mechanism for controlling the direction of travel of said car, said control mechanism being responsive to said output control signals from said up And circuit elements and said down And circuit elements to condition said car for traveling in the direction associated with the control signal first applied.

9. An elevator system comprising, an elevator car serving a plurality of landings, a hoisting motor for said car, actuating mechanism for said car, stopping mechanism for said car, means for each landing for registering calls for service for such landings by providing a voltage signal; comparison means including an up And circuit element for each landing located below the upper most landing and a down And circuit element for each landing located above the lowermost landing, each of said And elements having two input conditions and operable under conditions where both said conditions are simultaneously provided for producing an output control signal, means responsive to the position of said car at said respective landings to provide a first input condition for the And circuit elements associated with the landing at which the car is positioned until the car arrives at an adjacent landing, a blocking diode network interconnecting said call registering means to said up And circuit elements to provide the second input condition for the up And circuit elements associated with landings located below the landing for which the call is registered while blocking transmission to the up And circuits for landings located above, and also interconnecting said call registering means with said down And circuit elements to provide said second input condition for the down And circuit elements associated with landings located above the landing for which the call is registered while blocking transmission to the down And elements for landings located below; and direction control mechanism for controlling the direction of travel of said car, said control mechanism being responsive to output control signals from said up And circuit elements and said down And circuit elements and operable thereby to condition said car actuating means for car travel in a direction associated with the control signal first applied until service demand for the furthest landing in such direction is answered.

10. An elevator system comprising, an elevator car serving a plurality of landings, including upper and lower terminal landings, car call registering means, one for each of said landings, up hall call registering means, one for each of said landings located below said upper terminal landing, down hall call registering means, one for each of said landings located above said lower terminal landing; comparison means including a plurality of up static circuit elements, one for each of said landings located below, and a plurality of down static circuit elements one for each of said landings located above, each of said static circuit elements having two input conditions and operable under conditions where both said conditions are simultaneously provided for producing an output directional control signal, car position means responsive to the position of said car at said respective landings to provide separate signals indicating the presence of said car at such landings, memory means operable in response to said signals for maintaining a memory of the car position as the car travels between successive landings and providing a first input condition for the static circuit elements associated with the landing at which the car is positioned, means responsive to said car and hall call registering means under conditions where a call is registered for a landing for providing the second input condition for the up static circuit elements associated with landings located below the landing for which the call is registered and also to provide the second input condition for the down static circuit elements associated with landings located above the landing for which the call is registered, thereby providing both of said input conditions for the static circuit element corresponding to the position of the car and the direction in which the car must travel in order to respond to said registered call, to produce a respective directional control signal, car actuating mechanism for said car, up direction control mechanism operably responsive to such directional control signals from said up static circuit elements, down direction control mechanism operably responsive to such directional control signals from said down static circuit elements, said direction control mechanisms conditioning said car actuating mechanism for movement of said car in their respective directions until the furthest call registered in such directions is answered, and stop time means for establishing a stopping time for said car at a landing stop, said time being measured from the arrival of the car at such stop, said stop time means at the expiration of said measured time actuating said conditioned car actuating mechanism to operated condition.

11. An elevator system comprising, an elevator car serving a plurality of landings, including upper and lower terminal landings, call registering means, one for each of said landings for registering calls for service, comparison means including a plurality of up static circuit elements, one for each of said landings located below said upper terminal landing, and a plurality of down static circuit elements, one for each of said landings located above said lower terminal landing, each of said static circuit elements having two input conditions and operable under conditions where both said conditions are simultaneously provided for producing a respective output directional control signal, car position means responsive to the position of said car at said respective landings to provide separate signals indicating the presence of said car at such landings, memory means operable in response to said signals for maintaining a memory of the car position as the car travels between successive landings and providing a first input condition for the up and down static circuit elements associated with the landing at which the car is positioned, means responsive to said car and hall call registering means under conditions where a call is registered for a landing for providing the second input condition for the up static circuit elements associated with landings located below the landing for which the call is registered and also to provide the second input condition for the down static circuit elements associated with landings located above the landing for which the cell is registered, thereby providing both of said input conditions for the static circuit element corresponding to the present position of the car and the direction in which the car must travel in order to respond to such registered call and causing such static circuit element to produce its respective directional control signal, a hoisting motor for said car, stop time means operable in response to stopping of the car at a landing for establishing a stopping time measured from the arrival of the car at such landing stop, direction control mechanism responsive to such direction control signals from said up static circuit elements and said down static circuit elements, car actuating mechanism responsive to said direction control mechanism and said stop time means for actuating said hoisting motor to move said car in a selected direction at the expiration of said stopping time, and car stopping mechanism for stopping said car at landings for which a call is registered by causing the return of said car actuating mechanism to unactuated condition.

12. In a control system for an elevator car serving a plurality of landings, hoisting mechanism for said car, actuating means for causing operation of said hoisting mechanism to move said car in a given direction, control means for causing said hoisting mechanism to accelerate said car to full speed, speed responsive means responsive to certain speeds of said car and operable to produce a certain number of separate output signals in accordance with a certain number of corresponding car speeds and indicative thereof, car position means responsive to the position of said car at said respective landings to provide separate signals indicating the presence of said car at such landings, memory means operable in response to said position signals for maintaining a memory of the car position as it travels between successive landings, and means to advance fictitiously the position of said car by predetermined amounts in response to its speed, said advance means including a plurality of static circuit elements, each of which is associated with a corresponding one of said landings and a corresponding one of said certain speeds, said static elements each having two input conditions and being arranged to provide an output signal indicating a certain fictitiously advanced car position in response to provision simultaneously of its two respective input conditions by said speed responsive means and said car position memory means.

13. In a control system for an elevator car serving a plurality of landings, hoisting mechanism for said car, actuating means for causing operation of said hoisting mechanism to move said car in a given direction, control means for causing said hoisting mechanism to accelerate said car to a certain full speed, speed responsive means responsive to certain first, second and third progressively increasing speeds of said car in said given direction and operable to produce separate output speed signals in accordance with said corresponding progressively increasing car speeds and indicative thereof, car position means responsive to the position of said car at said respective landings to provide separate signals indicating the presence of said car at such landings, memory means operable in response to said position signals for maintaining a memory of the car position as it travels between successive landings in said given direction, and means to advance fictitiously the position of said car by predetermined amounts in response to its speed, said advance means including a plurality of first static circuit elements, each one of which is associated with a corresponding one of said landings, a plurality of second static circuit elements, each one of which is associated with a corresponding one of said landings and a plurality of third static circuit elements, each one of which is associated with a corresponding one of said landings, said static circuit elements each having two input conditions and being operatively responsive to said speed responsive means and said car position memory means to provide respective output advance signals, said first static elements in response to a first speed signal by said speed responsive means and memory of the position, of the car at their respective corresponding landings producing output advance signals indicating the position of the car to be advanced a first certain amount, said second static elements in response to a second speed signal by said speed responsive means and the memory of the position of the car at their respective corresponding landings producing second output advance signals indicating the position of the car to be advanced a second certain greater amount, said third static elements in response to a third speed signal by said speed responsive means and the memory of the position of the car at their respective corresponding landings producing a third advance output signal indicating the position of the car to be advanced a third still greater amount.

14. A combination as set forth in claim 13 wherein said static circuit elements each consists of an And circuit having two associated input conditions and arranged for providing an output signal under conditions where its associated two input conditions are satisfied simultaneously.

15. In a control system for an elevator car serving a plurality of landings, hoisting mechanism for said car, actuating means for causing operation of said hoisting mechanism to move said car in a given direction, control means for causing said hoisting mechanism to accelerate said car to a certain full speed, speed responsive means responsive to certain first, second and third progressively increasing speeds of said car in said given direction and operable to produce separate output speed signals in accordance with said corresponding progressively increasing car speeds and indicative thereof, car position means responsive to the position of said car at said respective landings to provide separate signals indicating the presence of said car at such landings, first memory means operable in response to said position signals for maintaining a memory of the car position as it travels between successive landings in said given direction, and means to advance fictitiously the position of said car by predetermined amounts in response to its speed, said advance means including a plurality of first static circuit elements, each one of which is associated with a corresponding one of said landings, a plurality of second static circuit elements, each one of which is associated with a corresponding one of said landings, and a plurality of third static circuit elements, each one of which is associated with a corresponding one of said landings, said static elements each having two input conditions and being operatively responsive to said speed responsive means and said car position first memory means to provide respective output advance signals, said first static elements in response to a first speed signal by said speed responsive means and memory of the position of the car at their respective corresponding landings producing output advance signals indicating the position of the car to be advanced a first certain amount, said second static elements in response to a second speed signal by said speed responsive means and the memory of the position of the car at their respective corresponding landings producing second output advance signals indicating the position of the car to be advanced a second certain greater amount, said third static elements in response to a third speed signal by said speed responsive means and the memory of the position of the car at their respective corresponding landings producing a third advance output signal indicating the position of the car to be advanced a third still greater amount, and second memory means operatively responsive to said advance output signals for maintaining said advanced car positions between successive advance output signals.

16. In a control system for an elevator car serving a plurality of landings, hoisting mechanism for said car, actuating means for causing operation of said hoisting mechanism to move said car in a given direction, control means for causing said hoisting mechanism to accelerate said car to full speed, speed responsive means responsive to certain speeds of said car and operable to produce separate output signals corresponding to said certain car speeds and indicative thereof, car position means responsive to the position of said car at said respective landings to provide separate signals indicating the presence of said car at such landings, memory means operable in response to said car position signals for maintaining a memory of the car position as said car travels between successive landings, and means to advance fictitiously the position of said car by predetermined amounts in response to its speed, said advance means including a plurality of first static circuit elements associated with a first one of said certain speeds for fictitiously advancing the position of said car a first certain amount, each one of which said first static elements is provided for a corresponding one of said landings, a plurality of second static circuit elements associated with a second one of said certain speeds for fictitiously advancing the position of said car a certain second greater amount, each one of which second static elements is provided for a corresponding one of said landings, a plurality of third static circuit elements associated with a third one of said certain speeds for fictitiously advancing the position of said car a third certain still greater amount, each one of which third static elements is provided for a corresponding one of said respective landings, said static circuit elements each having at least two input conditions and being responsive to output signals from said speed responsive means and car position means for producing respective output signals indicating a fictitiously advanced position of the car under conditions where the car is traveling at their respective associated speeds and is positioned at their corresponding landings.

17. In a control system for an elevator car serving a plurality of landings including stopping and starting terminal landings, hoisting mechanism for said car, actuating means for causing operation of said hoisting mechanism to move said car toward said stopping terminal landing, control means for causing said hoisting mechanism to accelerate said car to a certain full speed, speed responsive means responsive to certain first, second and third progressively increased speeds of said car and operable to produce separate output speed signals in accordance with such corresponding progressively increased car speeds and indicative thereof, car position means responsive to the position of said car at said respective landings to provide separate signals indicating the presence of said car at such landings, memory means operable in response to said position signals for maintaining a memory of the car position as it travels between successive landings, and means to advance fictitiously the position of said car by predetermined amounts in response to its speed, said advance means including a plurality of first static circuit elements, one for each of said landings except said starting terminal landing, a plurality of second static circuit elements, one for each of said landings except said starting terminal landing and the landing closest said starting terminal landing, a plurality of third static circuit elements, one for each of said landings except said starting terminal landing and the two landings closest said starting terminal landing, said static elements each being operatively responsive to said speed responsive means and said car position memory means to provide respective output advance signals, each one of said first static elements in response to a first speed signal by said speed responsive means and memory of the position of the car one landing closer the starting terminal landing than the corresponding landing for which it is provided producing a first advance output signal indicating the position of the car to be advanced to its such corresponding landing, each of said second static elements in response to a second speed signal by said speed responsive means and the memory of the position of the car two landings closer the starting terminal landing than the corresponding landing for which it is provided producing a second advance output signal indicating the position of the car to be advanced to its such corresponding landing, each one of said third static elements in response to a third speed signal by said speed responsive means and the memory of the position of the car three landings closer the starting terminal landing than the corresponding landing for which it is provided producing a third advance output signal indicating the position of the car to be advanced to its such corresponding landing, whereby the position of the car is advanced fictitiously a plurality of landings by said static elements in accordance with progressive increases in car speed as indicated by said speed responsive means.

18. In a control system for an elevator car serving a plurality of landings including stopping and starting terminal landings; hoisting mechanism for said car; actuating means for causing operation of said hoisting mechanism to move said car toward said stopping terminal landing; control means for causing said hoisting mechanism to accelerate said car to a certain full speed; speed responsive means responsive to certain first, second and third progressively increased speeds of said car and operable to produce separate output speed signals in accordance with said corresponding progressively increased car speeds and indicative thereof; car position means responsive to the position of said car at said respective landings to provide separate signals indicating the presence of said car at such landings; memory means operable in response to said position signals for maintaining a memory of the car position as it travels between successive landings; means to advance fictitiously the position of said car by predetermined amounts in response to its speed, said advance means including a plurality of first static circuit elements, one for each of said landings except said starting terminal landing, a plurality of second static circuit elements, one for each of said landings except said starting terminal landing and the landing closest said starting terminal landing, a plurality of third static circuit elements, one for each of said landings except said starting terminal landing and the two landings closest said starting terminal landing, said static elements each being operatively responsive to said speed responsive means and said car position memory means to provide respective output advance signals, each one of said first static elements in response to a first speed signal by said speed responsive means and memory of the position of the car one landing closer the starting terminal landing than the corresponding landing for which it is provided producing a first advance output signal indicating the position of the car to be advanced to its such corresponding landing, each of said second static elements in response to a second speed signal by said speed responsive means and the memory of the position of the car two landings closer the starting terminal landing than the corresponding landing for which it is provided producing a second advance output signal indicating the position of the car to be advanced to its such corresponding landing, each one of said third static elements in response to a third speed signal by said speed responsive means and the memory of the position of the car three landings closer the starting terminal landing than the corresponding landing for which it is provided producing a third advance output signal indicating the position of the car to be advanced to its such corresponding landing, whereby the position of the car is advanced fictitiously a plurality of landings by said static elements in accordance with progressive increases in car speed as indicated by said speed responsive means; and advance memory means responsive to said first, second and third advance output signals and operative thereby for maintaining between successive advance output signals a memory of the fictitiously advanced position of the car at said respective corresponding landings.

19. A combination as set forth in claim 18 wherein said speed responsive means include a tachometer generator driven by said hoisting mechanism to produce an output voltage proportional in magnitude to the speed of said car, three thyratron tube circuits, each having a thyratron tube, means applying certain respective non-conducting biases to said tubes, means applying said generator output voltage to the respective circuits of said tubes in opposition to said certain respective non-conducting biases, said certain respective non-conducting biases being selected of a magnitude to cause said tubes to fire and conduct in sequence as said car attains predetermined progressively increasing speeds.

20. A combination as set forth in claim 18 wherein said speed responsive means includes a tachometer generator driven by said hoisting mechanism to produce an output voltage proportional in magnitude to the speed of said car; first, second and third thyratron tubes, each having cathode, plate and grid electrodes; means applying certain graduated progressively increasing non-conducting biases to said first, second and third tubes, respectively; means applying said generator output voltage across the respective grid-cathode circuits of said tubes at a polarity opposite to said certain non-conducting biases, said certain non-conducting biases being selected of a magnitude to cause said tubes to fire and conduct in sequence as said car attains predetermined progressively increasing speeds, and control means responsive to the conducting condition of said tubes to provide output signals corresponding to said predetermined car speeds.

21. A combination as set forth in claim 18 wherein said speed responsive means includes a tachometer generator driven by said hoisting mechanism to produce an output voltage proportional in magnitude to the speed of said car; first, second and third thyratron tubes, each having cathode, plate and grid electrodes; a unidirectional power source having three output terminals and supplying to a first one of said terminals a potential of a certain magnitude and of positive polarity with respect to a second one of said terminals and supplying to the third one of said terminals a potential of a certain magnitude and of negative polarity with respect to said second terminal; means connecting said first and second terminals across the plate-cathode electrodes of said tubes; means including a first resistor of a certain ohmic value connecting said third terminal to the grid electrode of said first tube to provide a first certain non-conducting bias; means including a second resistor of ohmic value a predetermined amount less than that of said first resistor and connecting said third terminal to the grid electrode of said second tube to provide a second certain non-conducting bias greater by a certain amount than said non-conducting bias applied to said first tube; means including a third resistor of an ohmic value smaller than the ohmic value of said first resistor by a still greater predetermined amount and connecting said third terminal to the grid element of said third tube to provide a non-conducting bias of a still greater certain amount to said third tube; means applying said generator output voltage across the respective grid-cathode circuits of said tubes at a polarity opposite to said certain non-conducting biases, said certain non-conducting biases being selected of a magnitude to cause said tubes to fire and conduct in sequence as said car attains predetermined progressively increasing speeds, and control means responsive to the conducting condition of said tubes to provide output signals corresponding to said predetermined car speeds.

22. A combination as set forth in claim 18 wherein said car position means, to provide separate signals indicating the presence of said car at said respective landings, include a plurality of input signal producing means, means for selectively energizing said input signal producing means to produce in response to the arrival of the car at said respective landings, input signals in certain combinations, each one of which combinations corresponds to a separate one of such respective landings, means for translating said certain combinations of said input signals into individual output control signals, one each of which indicates the position of said car at a corresponding one of said respective landings, and means rendering said translating means inoperative until the coincidental energization of all said input signal producing means which are energized at each landing.

23. A combination as set forth in claim 18 wherein said car position means, to provide separate signals indicating the presence of said car at said respective landings, include a plurality of electric signal producing means each having two output terminals, means responsive to car movement for selectively energizing said signal producing means in certain code combinations corresponding to the position of said car at said respective landings, diode matrix means having a plurality of input terminals electrically connected to said output terminals of said signal producing means and also having a plurality of output terminals, one for each of said respective landings, said diode matrix means being arranged to decode said certain coded combinations by selectively producing in response thereto electric signals at said matrix output terminals in accordance with the corresponding position of said car, and means causing said diode matrix means to be inoperable for decoding until the simultaneous energization of the entire of said electric signal producing means which are energized for each said certain coded combination.

24. A combination as set forth in claim 18 wherein said advance memory means include a thyratron tube memory circuit consisting of a plurality of thyratron tubes, one tube for each of said corresponding landings, means biasing said tubes to non-conducting condition, said tube memory circuit being arranged to transfer conduction from a first conducting one of said tubes to a second one of said tubes under conditions where the latter tube is rendered conducting and to maintain said latter tube conducting until any other one of said tubes is subsequently rendered conducting, and wherein each one of which said static circuit elements consists of an And circuit having two input conditions and is operable under conditions where its said two input conditions are supplied simultaneously to apply a firing signal to the one of said memory tubes which is provided for its corresponding landing causing conduction to be transferred to such associated tube.

25. A combination as set forth in claim 18 wherein said advance memory means include a unidirectional power source having two output terminals, one of which is at a positive polarity with respect to the other, a plurality of thyratron tubes, one for each of said corresponding landings and having plate, grid and cathode electrodes, said plate electrodes being connected directly to a common junction point, a common plate resistor connected between said terminal of positive polarity and said common junction point, a cathode resistor and cathode capacitor connected in parallel circuit with each other for each of said tubes, each one of which parallel resistor-capacitor circuits connects the cathode electrode of the tube for which it is provided to said other terminal of said source, means biasing said tubes to non-conducting condition, and wherein each one of said first, second and third static circuit elements consists of an And circuit having two input conditions, said And circuit being operable under conditions where its respective two input conditions are supplied simultaneously to provide an output signal across the grid-cathode circuit of the gas tube provided for its corresponding landing, said output signal being of sufficient polarity and magnitude to overcome the non-conducting bias of such tube sufficiently to cause it to conduct, said power source supplying power of sufficient magnitude to maintain said tubes in conducting condition once conduction is initiated, said respective cathode condensers and said common plate resistor being selected of respective capacitive and ohmic values of sufficient magnitude to cause the extinguishment of a previously conducting one of said gas tubes under conditions where a subsequent one of said gas tubes is rendered conducting.

26. In a control system for an elevator car serving a plurality of landings, hoisting mechanism for said car, means for establishing a direction of travel for said car, car starting means for causing operation of said hoisting mechanism to move said car in a direction established by said direction means, car position means responsive to the position of said car at predetermined points located certain respective distances above and below each of said respective landings to provide separate signals indicating the presence of said car at such points, and means operable in response to starting of the car from any one of said landings to produce control signals for acceleration control of said hoisting mechanism, said signal producing means including a plurality of static circuit elements, each one of which is associated with a corresponding one of said points, said static elements each having at least two input conditions and being arranged to provide an output acceleration signal in response to provision simultaneously of its at least two respective input conditions by said direction means and said car position means as said car arrives at its said corresponding point displaced from said starting landing in the direction of car travel.

27. A combination as set forth in claim 26 wherein said car position means, to provide separate signals indicating the presence of said car at such respective points, include a plurality of input signal producing means, means for selectively energizing said input signal producing means to produce in response to the arrival of the car at such respective points, input signals in certain combinations, each one of which combinations corresponds to a separate one of such respective points, means for translating said certain combinations of said input signals into individual output control signals, one of which indicates the position of said car at a corresponding one of such respective points, and means rendering said translating means inoperative until the coincidental energization of all said input signal producing means which are energized at each such respective point.

28. In a control system for an elevator car operating in a hoistway and serving a plurality of landings, hoisting mechanism for said car; up control means for causing operation of said hoisting mechanism to move said car in the up direction; means for selectively stopping said car at said landings; car position means responsive to predetermined positions of said car in said hoistway, said points including said respective landings and certain deceleration points located certain distances below each of said respective landings, to provide separate signals indicating the presence of said car at such predetermined positions; memory means operable in response to said position signals for maintaining a memory of the car position as it travels between successive ones of said landings; means responsive to said up control means and said stopping means to produce a deceleration requirement signal under conditions where a landing stop is selected for said car; counting means responsive to said stopping means and said car position memory means and operable thereby for counting the landings passed by said car subsequent to the selection of a landing stop; means operable by said hoisting mechanism to produce separate speed signals in accordance with certain speeds of said car; and deceleration control means to control the deceleration of said car by said hoisting mechanism, said deceleration control means including a plurality of static circuit elements, each of which is associated with a corresponding one of said points below, a corresponding one of said car speeds and a corresponding count of said landings passed, said static circuit elements being arranged selectively to produce in accordance with the speed of the car when the landing stop is selected separate corresponding deceleration control output signals to control deceleration of said car by said hoisting mechanism at a selected landing stop as the car arrives at their respective corresponding points below such selected landing.

29. A combination as set forth in claim 28 wherein said speed signal means include a tachometer generator driven by said hoisting mechanism to produce an output voltage proportional in magnitude to the speed of said car; first, second and third thyratron tubes, each having cathode, plate and grid electrodes; means applying certain graduated progressively increasing non-conducting biases to said first, second and third tubes, respectively; means applying said generator output voltage across the respective grid-cathode circuits of said tubes at a polarity opposite to said certain non-conducting biases, said certain non-conducting biases being selected of a magnitude to cause said tubes to fire and conduct in sequence as said car attains predetermined progressively increasing speeds, and control means responsive to the conducting condition of said tubes to provide output signals corresponding to said certain car speeds.

30. A combination as set forth in claim 28 wherein said car position means, to provide separate signals indicating the presence of said car at such predetermined positions in said hoistway, include a plurality of input signal producing means, means selectively energizing said input signal producing means to produce in response to the arrival of the car at such respective predetermined positions input signals in certain combinations, each one of which combinations corresponds to a separate one of such respective predetermined positions, means for translating said certain combinations of said input signals into individual output control signals, one each of which indicates the position of said car at a corresponding one of such respective predetermined positions, and means rendering said translating means inoperative until the coincidental energization of all said input signal producing means which are energized at each said predetermined position.

31. In a control system for an elevator car serving a plurality of landings, hoisting mechanism for said car, means for establishing a direction of travel for said car, car starting means for causing operation of said hoisting mechanism to move said car in a direction established by said direction means, means for initiating stopping of the car at selected ones of said landings, car position means responsive to the position of said car at predetermined points located certain respective distances above and below each of said respective landings to provide separate signals indicating the presence of said car at such points, means operable in response to the starting of the car from any one of said landings to produce a first control signal to require acceleration control of said hoisting mechanism and operable in response to initiation of stopping said car at said landings to remove said first control signal and produce a second control signal to require deceleration control of said hoisting mechanism, and a plurality of static circuit elements, each one of which is associated with a corresponding one of said points above and below and with a direction of travel of said car with respect to the landings for which said points are provided, said static circuit elements each having at least three input conditions and being arranged to provide an output control signal in response to simultaneous provision of its respective input conditions, said car position means, said direction of car travel means and said first and second control signal producing means causing certain of said static circuit elements to produce output control signals for acceleration control of said hoisting mechanism under conditions where said car is started from a landing in their respective associated direction and its position coincides with their respective points displaced from said landing in such direction and under conditions where stopping of said car at a landing is initiated causing certain others of said static circuit elements to produce output control signals for deceleration control of said hoistway mechanism as the car position coincides with their respective points displaced from said landing in a direction opposite to the direction of car travel.

32. A combination as set forth in claim 31 wherein said means to produce said acceleration and deceleration requirement control signals include a flip-flop circuit operable to a first condition by said car starting means to produce said acceleration requirement control signal and operable to a second condition by said car stop initiating means to produce said deceleration requirement control signal.

33. An elevator system comprising, an elevator car arranged for vertical movement in a hoistway for servicing a plurality of landings; hoisting mechanism for said car; actuating mechanism for said car; means for each landing for registering demands for service for such landings; a plurality of input signal producing means; means for selectively energizing said input signal producing means to produce in response to the arrival of the car at predetermined positions in said hoistway electric input signals in predetermined combinations, each one of which combinations in accordance with a predetermined binary code corresponds to a separate one of said respective predetermined positions, at least some of which positions include said landings; means for translating said predetermined combinations of electric input signals into output control signals, one each of which indicates the location of said car at a corresponding one of said predetermined positions; enabling means operative in response to the location of said car outside a predetermined region located at each said predetermined position for preventing said translating means from translating into an output control signal the combination of electric input signals corresponding to the position at which the car is located, said enabling means being operative when the car enters said region for enabling said translating means to translate the combination of electric input signals corresponding to the position at which the car is located into the control signal indicative of the location of said car at said predetermined position; means including static circuit elements responsive to said output control signals indicative of the location of said car at said landings to advance fictitiously the position of said car by a predetermined number of landings in accordance with its speed; and means for initiating stopping of said car at said landings in response to said demands for service, said stopping means including a plurality of static circuit elements, one for each of said landings, each one of which said static circuit elements has two input conditions and is operable upon simultaneous satisfaction of both its respective input conditions to produce an output control signal to initiate stopping of said car at its associated landing, said two respective input conditions being simultaneously satisfied under conditions where a service demand is registered by said demand registering means for the landing for which such static circuit element is provided and the position of said car is advanced fictitiously by said advance means to such associated landing.

34. An elevator system comprising, an elevator car arranged for vertical movement in a hoistway for servicing a plurality of landings, hoisting mechanism for said car, actuating mechanism for said car, means for each landing for registering demands for service for such landings, a plurality of input signal producing means, means for selectively energizing said input signal producing means to produce in response to the arrival of the car at predetermined positions in said hoistway electric input signals in predetermined combinations, each one of which combinations in accordance with a predetermined binary code corresponds to a separate one of said respective predetermined positions, at least some of which positions include said landings, means for translating said predetermined combinations of electric input signals into output control signals, one each of which indicates the location of said car at a corresponding one of said predetermined positions, enabling means operative in response to the location of said car outside a predetermined region located at each said predetermined position for preventing said translating means from translating into an output control signal the combination of electric input signals corresponding to the position at which the car is located, said enabling means being operative when the car enters said region for enabling said translating means to translate the combination of electric input signals corresponding to the position at which the car is located into the control signal indicative of the location of said car at said predetermined position, means including static circuit elements responsive to said output control signals indicative of the location of said car at said landings to advance fictitiously the position of said car by a predetermined number of landings in accordance with its speed, means for initiating stopping of said car at said landings, in response to said demands for service, said stopping means including a plurality of static circuit elements, one for each of said landings and having two input conditions, each one of which said static circuit elements is operable upon simultaneous satisfaction of both its respective input conditions to produce an output control signal to initiate stopping of said car at its associated landing, said respective input conditions being simultaneously satisfied under conditions where a service demand is registered by said demand registering means for the landing for which such static circuit element is provided and the position of said car is advanced fictitiously by said advance means to such associated landing, and demand cancelling means operatively responsive to said stop initiating means for cancelling the demand for service at landings at which a stop is to be made.

35. An elevator system comprising, an elevator car operating in a hoistway and serving a plurality of landings, hoisting mechanism for said car, means for registering demands for service for said landings, actuating means responsive to said demand registering means and operable thereby for causing said hoisting mechanism to move said car to respond to said registered demand, stopping mechanism for said car for causing said hoisting mechanism to stop said car at landings for which service demand is registered by said demand registering means, car position means responsive to the position of said car at predetermined points in said hoistway to provide separate signals indicating the presence of said car at such points, said points including a down leveling point located a certain minimum stopping distance above each of said landings and an up leveling point located a certain minimum stopping distance below each of said landings, and leveling control means for causing leveling operation of said hoisting mechanism to bring said car to a level with a landing at which a stop is to be made, said leveling control means being operatively responsive to said stopping mechanism and said car position means and being operable under conditions where said car in stopping at a landing travels past the landing at which a stop is to be made at least said certain minimum stopping distance, said leveling control means including timing mechanism to establish a certain operating time for said leveling control means, said certain operating time being measured from the arrival of said car at the leveling point located said certain minimum stopping distance past such landing and being of a magnitude determined sufficient for said hoisting mechanism to level said car back to such landing said certain minimum stopping distance.

36. A combination as set forth in claim 35 wherein said car position means, to provide separate signals indicating the presence of said car at such predetermined points in said hoistway include a plurality of input signal producing means, means for selectively energizing said input signal producing means to produce in response to the arrival of the car at such respective predetermined points input signals in certain combinations, each one of which combinations corresponds to a separate one of such respective predetermined points, means for translating said certain combinations of said input signals into individual output control signals, one each of which indicates the position of said car at a corresponding one of such respective predetermined points, and means rendering said translating means inoperative until the coincidental energization of all said input signal producing means which are energized at each such respective predetermined point.

*37. An elevator control circuit for ascertaining the existence of any call for service displaced in a given direction beyond a given landing, comprising a plurality of OR's, each associated with a landing displaced in said given direction beyond said given landing, first and second inputs and an output for each of said OR's, a signal source representative of a call for service at said associated landing coupled to said first input of each of said OR's said OR's being connected in series with the output of each OR for each landing but the last in the series being connected to the second input of the OR for the landing next adjacent in a direction opposite said given direction whereby a call for service at any landing gates the OR associated therewith and the OR's of all succeeding landings displaced therefrom in said direction opposite said given direction.*

*38. An elevator control circuit for ascertaining the existence of any call for service at a landing having a given relationship to the effective location of the elevator*

*car, comprising a plurality of OR's each associated with a landing, first and second inputs and an output for each of said OR's, a signal source representative of a call for service at said associated landing coupled to said first input, said OR's being connected in series with the output of each OR for each landing but the last series being connected to the second input of the OR for the landing next adjacent in a given direction, a plurality of AND's each associated with a given landing, first and second inputs and an output for each AND, a coupling to the first input of each AND from the output of an OR associated with a landing having a given relationship to the landing of said AND, and a signal source representative of effective car position at said associated landing coupled to the second input of each AND, whereby a signal gated at any of said AND's indicates the effective location of said car at the landing associated with said AND and the registration for a call for service at a landing having said given relationship to said effective car position.*

*39. A combination according to claim 38 including an output OR, an input for said output OR corresponding to each of said AND's and a coupling between said output of each of said AND's and a respective input of said output OR whereby the gating of said OR signifies the existence of a call having a given relationship to the effective car position.*

*40. A combination according to claim 38 wherein said OR's of associated landings are arranged in an ascending sequence and the output of each OR is coupled to the first input of an AND associated with the next higher landing, whereby gating of an AND signifies existence of a call below the car.*

*41. A combination according to claim 38 wherein said OR's of associated landings are arranged in descending sequence and the output of each OR is coupled to the first input of an AND associated with the next lower landing, whereby gating of an AND signifies existence of a call above the car.*

*42. A combination according to claim 38 wherein the output of each OR is coupled to the first input of an AND associated with a next adjacent landing, whereby gating of an AND signifies existence of a call beyond the effective car position.*

References Cited

The following references, cited by the Examiner, are of record in the patented file of this patent or the original patent.

UNITED STATES PATENTS

| | | | |
|---|---|---|---|
| 2,474,861 | 7/1949 | Putt | 187—29 |
| 3,040,838 | 6/1962 | Suozzo et al. | 187—29 |
| 2,347,054 | 4/1944 | Hunt | 187—29 |
| 2,657,765 | 11/1953 | Savage | 187—29 |
| 2,806,554 | 9/1957 | Hall et al. | 187—29 |
| 2,840,188 | 6/1958 | Savage | 187—29 |
| 2,938,603 | 5/1960 | Loughridge | 187—29 |
| 2,960,187 | 11/1960 | Bruns et al. | 187—29 |
| 3,146,857 | 9/1964 | Bosshard | 187—29 |

FOREIGN PATENTS

| | | |
|---|---|---|
| 569,658 | 6/1961 | Belgium. |
| 1,160,038 | 7/1958 | France. |
| 1,109,848 | 6/1961 | Germany. |

BENJAMIN DOBECK, Primary Examiner

W. E. DUNCANSON, Jr., Assistant Examiner